(12) United States Patent
Jindal et al.

(10) Patent No.: US 11,787,420 B2
(45) Date of Patent: Oct. 17, 2023

(54) METHOD AND SYSTEM TO PREDICT VARIATION IN MILEAGE OF A VEHICLE AS PER FUEL IN FUEL TANK, FUEL DENSITY, TIRE AIR PRESSURE AND TO OPTIMIZE IT

(71) Applicants: Rahul Jindal, Punjab (IN); Rohan Garg, Punjab (IN)

(72) Inventors: Rahul Jindal, Punjab (IN); Rohan Garg, Punjab (IN)

(\*) Notice: Subject to any disclaimer, the term of this patent is extended or adjusted under 35 U.S.C. 154(b) by 0 days.

(21) Appl. No.: 17/767,155

(22) PCT Filed: Nov. 10, 2020

(86) PCT No.: PCT/IB2020/060563
§ 371 (c)(1),
(2) Date: Apr. 7, 2022

(87) PCT Pub. No.: WO2021/094911
PCT Pub. Date: May 20, 2021

(65) Prior Publication Data
US 2022/0363272 A1  Nov. 17, 2022

(30) Foreign Application Priority Data

Nov. 11, 2019  (IN) ............................. 201911045727

(51) Int. Cl.
*H04N 5/44* (2011.01)
*B60W 50/00* (2006.01)
(Continued)

(52) U.S. Cl.
CPC ...... *B60W 50/0097* (2013.01); *B60W 40/105* (2013.01); *B60W 50/14* (2013.01);
(Continued)

(58) Field of Classification Search
CPC ........... B60W 50/0097; B60W 40/105; B60W 50/14; B60W 2050/146;
(Continued)

(56) References Cited

U.S. PATENT DOCUMENTS 9,026,343 B2\* 5/2015 Mays .................. B60W 10/184
701/32.8
9,162,679 B2 10/2015 Sujan et al.
2002/0133271 A1\* 9/2002 McDermott ........... G07C 5/008
701/1
2002/0186144 A1\* 12/2002 Meunier ................ G07B 15/00
340/901
(Continued)

FOREIGN PATENT DOCUMENTS

CA         2762807 C     4/2016
DE    112011104561 T5   11/2013
(Continued)

*Primary Examiner* — Munear T Akki

(57) ABSTRACT

A mileage prediction and optimization system (FIG. 1) is disclosed for optimizing the mileage of a vehicle. The mileage prediction and optimization system comprises a prediction and optimization module (300) adapted to determine variation in mileage of the vehicle at least based on the current fuel volume, current speed, current fuel density, the current tire air pressure, the current tire air temperature, current fetched values from an ECU module (700) and the pre-defined mileage data of the vehicle. Further, the prediction and optimization module (300) is adapted to optimize the mileage of the vehicle by reducing variation of fuel density, reducing variation of tire air pressure and informing optimal gear-speed combinations to a user regardless of whether the vehicle is stationary or in motion.

38 Claims, 17 Drawing Sheets

(51) Int. Cl.
*H04W 4/40* (2018.01)
*B60W 40/105* (2012.01)
*B60W 50/14* (2020.01)

(52) U.S. Cl.
CPC ........ *H04W 4/40* (2018.02); *B60W 2050/146* (2013.01); *B60W 2510/0676* (2013.01); *B60W 2530/13* (2021.08); *B60W 2530/20* (2013.01); *B60W 2530/209* (2020.02); *B60W 2555/20* (2020.02); *B60W 2556/60* (2020.02)

(58) Field of Classification Search
CPC ..... B60W 2510/0676; B60W 2530/13; B60W 2530/20; B60W 2530/209; B60W 2555/20; B60W 2556/60; B60W 2520/10; B60W 2530/211; B60W 2530/213; B60W 40/00; H04W 4/40
See application file for complete search history.

(56) References Cited

U.S. PATENT DOCUMENTS

| | | | | |
|---|---|---|---|---|
| 2004/0064247 | A1* | 4/2004 | Davis | G07B 15/02 |
| | | | | 701/533 |
| 2005/0192727 | A1 | 9/2005 | Shostak et al. | |
| 2006/0017549 | A1* | 1/2006 | Nguyen | G09F 21/04 |
| | | | | 340/693.9 |
| 2006/0229780 | A1* | 10/2006 | Underdahl | B60R 25/00 |
| | | | | 701/2 |
| 2009/0118899 | A1* | 5/2009 | Carlson | G01C 22/02 |
| | | | | 701/33.4 |
| 2010/0185357 | A1* | 7/2010 | Mizumachi | B60L 53/14 |
| | | | | 701/31.4 |

FOREIGN PATENT DOCUMENTS

| | | |
|---|---|---|
| EP | 2472230 A2 | 7/2012 |
| WO | 2012088537 A1 | 6/2012 |

* cited by examiner

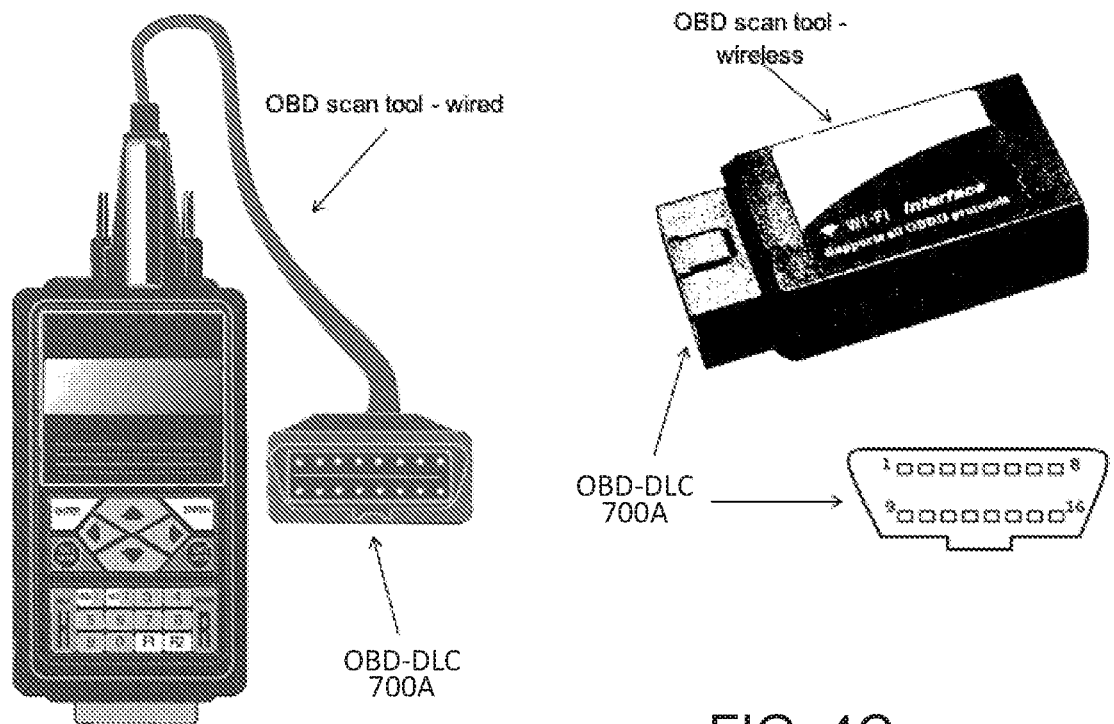
FIG. 4B
FIG. 4C
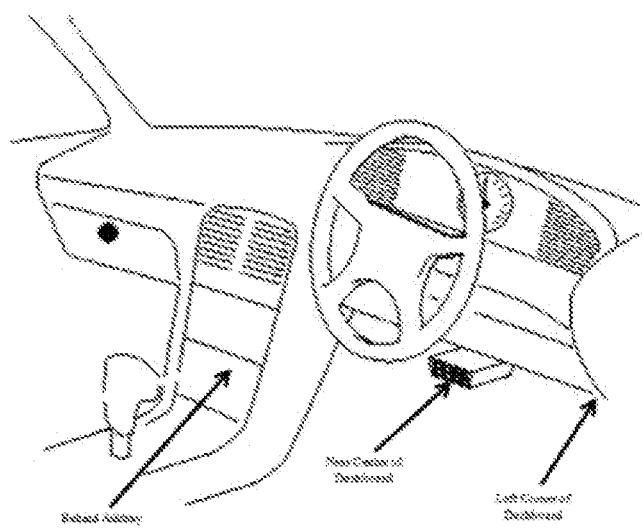
FIG. 4D

Interface Example 604

Interface Example 605

Interface Example 606

Interface Example 607

- Current Fuel Density = 0.987
- Actual Fuel Density = 1.000
- Variation = 0.013
- Predicted Variation in mileage = 3 %

| Required air pressure = 35 | | | | |
|---|---|---|---|---|
| Air pressure | Tire 1 | Tire 2 | Tire 3 | Tire 4 |
| Current | 32 | 30 | 27 | 34 |
| Variation | -3 | -5 | -8 | -1 |

Predicted Variation in mileage = (-10 %)
!! Warning!! – Your tire pressure is lower than required. This may damage your tire and is affecting vehicle's mileage. Kindly maintain proper air pressure and bring it to required level.

| Speed | Pre-Tested Mileage | Predicted Mileage | Suggested Gear |
|---|---|---|---|
| 10 | 17 | 14 | 1 |
| 20 | 21 | 16 | 2 |
| 30 | 24 | 19 | 3 |
| 40 | 26 | 21 | 4 |
| 50 | 28 | 23 | 4 |
| 60 | 25 | 20 | 5 |
| 70 | 22 | 18 | 5 |
| 80 | 18 | 15 | 6 |
| 90 | 16 | 13 | 6 |
| 100 | 14 | 11 | 6 |

Interface Example 608

FIG. 6H

- Current Fuel Density = 0.987
- Actual Fuel Density = 1.000
- Variation = 0.013
- Predicted Variation in mileage = 3 %

| Required air pressure = 35 | | | | |
|---|---|---|---|---|
| Air pressure | Tire 1 | Tire 2 | Tire 3 | Tire 4 |
| Current | 40 | 37 | 43 | 35 |
| Variation | +5 | +2 | +8 | 0 |

Predicted Variation in mileage = (+5 %)
!! Warning!! – Your tire pressure is higher than required. This may damage your tire. Kindly maintain proper air pressure and bring it to required level.

| Speed | Pre-Tested Mileage | Predicted Mileage | Suggested Gear |
|---|---|---|---|
| 10 | 17 | 18 | 1 |
| 20 | 21 | 22 | 2 |
| 30 | 24 | 26 | 3 |
| 40 | 26 | 27 | 4 |
| 50 | 28 | 30 | 4 |
| 60 | 25 | 27 | 5 |
| 70 | 22 | 23 | 5 |
| 80 | 18 | 19 | 6 |
| 90 | 16 | 17 | 6 |
| 100 | 14 | 15 | 6 |

Interface Example 609

FIG. 6I

Interface Example 610

- Current Fuel Density = 0.987
- Actual Fuel Density = 1.000
- Variation = 0.013
- Predicted Variation in mileage = 3 %

Required air pressure = 35

| Air pressure | Tire 1 | Tire 2 | Tire 3 | Tire 4 |
|---|---|---|---|---|
| Current | 32 | 30 | 27 | 34 |
| Variation | -3 | -5 | -8 | -1 |

Predicted Variation in mileage = (-10 %)
!! Warning!! – Your tire pressure is lower than required. This may damage your tire and is affecting vehicle's mileage. Kindly maintain proper air pressure and bring it to required level.

Available Fuel Quantity – 2.610

| Speed | Predicted Mileage | Distance To Empty | No of Fuel Stations |
|---|---|---|---|
| 10 | 14 | 36.4 | 0 |
| 20 | 16 | 41.6 | 1 |
| 30 | 19 | 49.4 | 1 |
| 40 | 21 | 54.6 | 2 |
| 50 | 23 | 59.8 | 2 |
| 60 | 20 | 52 | 2 |
| 70 | 18 | 46.8 | 1 |
| 80 | 15 | 39 | 0 |
| 90 | 13 | 33.8 | 0 |
| 100 | 11 | 28.6 | 0 |

Interface Example 610

FIG. 6J

Interface Example 611

- Current Fuel Density = 0.987
- Actual Fuel Density = 1.000
- Variation = 0.013
- Predicted Variation in mileage = 3 %

Required air pressure = 35

| Air pressure | Tire 1 | Tire 2 | Tire 3 | Tire 4 |
|---|---|---|---|---|
| Current | 40 | 37 | 43 | 35 |
| Variation | +5 | +2 | +8 | 0 |

Predicted Variation in mileage = (+5 %)
!! Warning!! – Your tire pressure is higher than required. This may damage your tire. Kindly maintain proper air pressure and bring it to
required level.

Available Fuel Quantity – 2.610

| Speed | Predicted Mileage | Distance To Empty | No of Fuel Stations |
|---|---|---|---|
| 10 | 18 | 46.8 | 1 |
| 20 | 22 | 57.2 | 2 |
| 30 | 26 | 67.6 | 3 |
| 40 | 27 | 70.2 | 4 |
| 50 | 30 | 78 | 4 |
| 60 | 27 | 70.2 | 4 |
| 70 | 23 | 59.8 | 2 |
| 80 | 19 | 49.4 | 1 |
| 90 | 17 | 44.2 | 1 |
| 100 | 15 | 39 | 0 |

Interface Example 611

FIG. 6K

Interface Example 612

| Pump | Fuel Density | Variation |
|---|---|---|
| A | 0.997 | 0.003 |
| B | 0.998 | 0.002 |
| C | 0.996 | 0.004 |
| D | 0.994 | 0.006 |
| E | 0.997 | 0.003 |
| F | 0.998 | 0.002 |

Interface Example 613

METHOD AND SYSTEM TO PREDICT VARIATION IN MILEAGE OF A VEHICLE AS PER FUEL IN FUEL TANK, FUEL DENSITY, TIRE AIR PRESSURE AND TO OPTIMIZE IT

CROSS-REFERENCE TO RELATED APPLICATIONS AND PRIORITY

The present application claims priority from Indian Patent Application number 201911045727 filed on 11 Nov. 2019, incorporated herein by reference.

FIELD OF THE INVENTION

The presently disclosed subject matter relates generally to a method and a system for measuring fuel dispensed in fuel tank, fuel density and tire air pressure of a vehicle to predict mileage and variation in it and to optimize it. More particularly, the present invention relates to providing predicted mileage information to the driver and to optimize the variation in predicted mileage by reducing variation in fuel density, tire air pressure and to drive at fuel efficient gear-speed combination.

BACKGROUND

Fuel economy of a vehicle is influenced by many factors such as fair amount of fuel dispensed by fuel pump, density of fuel being used, tire air pressure, way an operator selects gear and maintains vehicle speed, cargo or passengers' weight, air conditioner On/Off etc. Adulteration in fuel affects, its density and calorific value, the fuel efficiency of a vehicle. Some fuel stations cheat customers by not providing them the fair quantity of fuel as per the bill. Improper tire pressure of vehicle increases tires friction with road resulting in lower fuel efficiency Improper gear selection creates rapid transitions in speed that effects the fuel efficiency of the vehicle. Generally, vehicle operators rely upon the information provided by fuel pumps regarding quantity and quality of fuel, Air pressure monitoring machines to monitor tire air pressure, speedometers and tachometers to inform themselves of their vehicle's current operating condition, with fuel purchase patterns providing information about variation in mileage. Occasionally, some speed regulating systems employed that compare actual vehicle speed to pre-determined values of mileage and such systems can be somewhat effective in monitoring and controlling vehicle performance over a given course.

Each vehicle has different tire conditions and has different fuel efficiency and their users adopt several methods to determine/predict the fuel efficiency of their vehicle. For example, some users calculate the fuel efficiency of their vehicle by noting down the distance travelled by their vehicle in fixed amount of fuel. Further, there are some systems which display the information about fuel and mileage of a vehicle based on the instantaneous and previous travel history of the vehicle.

Since fuel efficiency is based on quality of fuel, condition of vehicle at the operational stage, driving habits, speed gear combination, road/traffic conditions etc., it can be improved by using better quality of fuel, keeping the vehicle in optimal health and improving driving habits etc. There is no implementation which predicts and communicates variation in mileage of a vehicle with respect to the quality of fuel used, air pressure in tires, cargo or passenger weight, turning air conditioner On/Off and gear selection at particular speed.

Fuel density measuring devices: Existing Fuel density measuring devices measure density of fuel only. This can be done manually using many tools such as hydrometer etc. These devices are limited to measuring fuel density only and are so far unable to establish connection between variation in fuel density and its impact on mileage of vehicle. So, there is a need to have a system which will inform the user in advance about variation in mileage of his vehicle at different speeds with respect to variation in density of his vehicle.

Air pressure monitoring devices: Existing Air pressure monitoring devices measure tire air pressure only. Variation in air pressure in tires of vehicle leads to variation in mileage of a vehicle. These air pressure monitoring devices are limited to measuring air pressure only and are so far unable to establish connection between variation in tire air pressure and its impact on mileage of vehicle. Since mileage of a vehicle varies with change in speed, it becomes even more difficult to calculate and predict variation in mileage corresponding to each speed.

So, there is a need to have a system which will inform the user in advance about variation in mileage of his vehicle at different speeds with respect to variation in tire air pressure of vehicle.

Fuel stations on route: Existing system informs about the fuel stations nearby to the user or on the route followed by user. The system shows the name of the fuel station, its distance from the driver, and how to get there. There are some limitations of the existing systems. One of such limitation is that density/quality of fuel varies at each fuel station. The existing system doesn't give information about the number of fuel stations available on along with the measured fuel density/quality at particular fuel station. Absence of this information may lead to refueling the vehicle at fuel station with poor density/quality of fuel which is not economical to the user.

So there is a need to have a system which will inform the user about the fuel stations along with measured fuel density at particular fuel station.

Mileage variation prediction for stationary vehicle: Existing system informs about the instantaneous or overall mileage of a vehicle only when the vehicle is in motion and is driven at some speed. None of the available systems are capable of informing variation in mileage of vehicle when the vehicle is stationary or the engine is turned off. So there is need to have a system which take into account the pre-determined values of mileage for a particular vehicle and integrate it with the parameters of vehicle which can be checked even when the vehicle is stationary e.g. Fuel density, tire air pressure etc. and predict variation in mileage of a vehicle even when the vehicle is stationary.

Indian patent Application 3265/DEL/2013 and 201611031492 discloses a device to be used in automobiles for indicating the measured value of speed along with pre-calibrated value of fuel efficiency and suggested gear number simultaneously using moving coil deflection meters or their equivalent display arrangements used for indicating speed, speed markings/calibrations used for measuring speed of vehicle, pre-calibrated fuel efficiency markings for giving fuel efficiency, optimal gear markings for suggested gear for the corresponding speed indicated by deflection of a single pointer. It suggests the driver to drive the vehicle at optimum speed to maximize fuel efficiency and minimize wear and tear of the vehicle along with warning beyond safe limits of speed in the given country/state. 3265/DEL/2013 is limited to being just a method of display consisting multiple parameter display like multimeter which can be applied on analog speedometer only. 201611031492 is merely a software code limited to displaying predetermined mileage in idle conditions only which can be maintained in controlled environments only such as automotive testing labs etc. None of the above mentions applications considers real time scenario into account as each and every vehicle has different vehicular conditions while driving.

In the known and existing prior arts, there are no system or method which provides optimization and prediction of mileage variation of the vehicle with respect to density of fuel being used, variation in tire air pressure and other real time vehicle running conditions simultaneously based on pre-defined mileage data.

Therefore, it is desirable to provide a system that overcomes the problems associated with the prior art described above.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

The present invention provides a system and a method to predict vehicle mileage by measuring variation in fuel density and tire air pressure of vehicle.

According to an object of the present invention, a mileage prediction and optimization system for a vehicle comprising: a measuring and processing module configured to measure current fuel volume, current fuel density, current fuel temperature, current tire air pressure, current tire air temperature of the vehicle; a speed measuring module configured to measure current speed of the vehicle; an Electronic Control Unit (ECU) module configured to fetch values from a plurality of sensors; a memory configured to store at least one predefined mileage value; a prediction and optimization module coupled to the measuring and processing module, the speed module, the ECU module, and the memory, wherein the prediction and optimization module being configured to: determine variation in mileage of the vehicle at least based on the current fuel volume, current speed, current fuel density, the current tire air pressure, the current tire air temperature, current fetched values from the ECU module and the pre-defined mileage data of the vehicle, and optimize mileage of the vehicle by reducing variation of fuel density, reducing variation of tire air pressure and informing optimal gear-speed combinations regardless of whether the vehicle is stationary or in motion; and a display module configured to display at least predicted variation in the mileage, variation in the fuel density, variation in the tire air pressure, predicted mileage corresponding to different gear-speed combinations.

According to an object of the present invention, a method for predicting and optimizing vehicle mileage comprising: receiving a current fuel volume, a current fuel density, a current fuel temperature, a current tire air pressure, a current tire air temperature of the vehicle, via a measuring and processing module; receiving a current speed of the vehicle, via a speed measuring module; fetching current values of plurality of sensors, via an ECU module; storing, via a memory at least a pre-defined mileage value; determining variation in mileage of the vehicle, via a prediction and optimization module based on the current fuel volume, current speed, current fuel density, current fuel temperature, current tire air pressure, current tire air temperature, current fetched values from the ECU module, and the pre-defined mileage data of the vehicle; optimizing mileage of the vehicle, via a prediction and optimization module by reducing variation in fuel density, reducing variation in air pressure and by informing optimal gear-speed combinations, regardless of whether the vehicle is stationary or in motion; and displaying, via a display module, at least predicted variation in the mileage, variation in the fuel density, variation in the tire air pressure and predicted mileage corresponding to the gear-speed combinations.

According to an object of the invention, the measuring and processing module is coupled to a fuel volume measuring module, a fuel density measuring module, a fuel temperature measuring module, a tire air pressure measuring module and a tire air temperature measuring module to measure fuel volume, fuel density, fuel temperature, tire air pressure, tire air temperature of the vehicle.

According to another object of the invention, the prediction and optimization module is adapted to measure variations in fuel density and tire air pressure from recommended value and to calculate corresponding variation in mileage of a particular vehicle.

According to an object of the invention, the measuring and processing module is configured to inflate or deflate a vehicle tire to reduce the variation in tire air pressure of the vehicle.

According to another object of the invention, the prediction and optimization module is coupled to a distance estimation module being configured to estimate information about distance to empty and time to reach destination at different gear-speed combinations.

According to another object of the invention, the prediction and optimization module is coupled to a GPS data processing module being configured to determine location and of places such as, but not limited to fuel stations, vehicle air monitoring stations, hospitals, garages, washrooms, restaurants, or a combination thereof corresponding to different routes those are reachable before the fuel goes empty.

According to another object of the invention, the prediction and optimization module is coupled to the display module comprising an audio/video unit to communicate with a user of the vehicle suggesting information such as, but not limited to, gears at current speeds, mileage at current speeds, mileage variation and gear change prediction at other speeds, current fuel density, current air pressure, ECU data, fuel station information with measured fuel density, best route to follow to achieve effective mileage, fuel prices by location match, or combination thereof.

According to an object of the invention, the pre-defined mileage data is related to at least one of parameters such as, but not limited to, the different gear-speed combinations, fuel density, tire air pressure, values received from the ECU module, or a combination thereof.

According to another object of the invention, the ECU module is configured to fetch values from the plurality of sensors such as, but not limited to, speed, gear value, fuel level, vehicle loading.

According to another object of the invention, the values are fetched by the ECU module of vehicle using OBD tool via wired and wireless based communication to fetch other vehicle related parameters like speed, Gear value, fuel level, or a combination thereof.

According to another object of the invention, the plurality of sensors are configured to sense values related to the vehicle, such as, but not limited to speed sensor, fuel level sensor, air pressure sensor, engine temperature sensor, or a combination thereof.

According to the preferred embodiment of the present invention, a system is adapted to communicate to the user the predetermined, calculated and measured information about mileage variation via interface even if vehicle is stationary or not in motion.

According to an object of the invention, the stationary or moving state of the vehicle is based on the velocity information obtained from the GPS data.

According to an object of the invention, a data transmitting module coupled to the mileage prediction and optimization module and an application server, adapted to provide a communication interface.

According to another object of the invention, the data transmitting module is wired or wireless communication system.

According to yet another object of the invention, the data transmitting module is based on Low Power Wide Area Network (LPWAN) technology such as, but not limited to, LTE-M, LTE-MTC, narrowband IoT (NB-IoT).

According to yet another object of the invention, the measured data of fuel density, tire air pressure, tire air temperature, fuel station details etc. is communicated to the prediction and optimization module and the application server using Low Power Wide Area Network (LPWAN) technology.

According to yet another object of the invention, the measured data of fuel density, tire air pressure, tire air temperature, fuel station details etc. is communicated to the prediction and optimization module and an application server using wired and wireless based communication.

According to an object of the invention, a vehicle related information module is configured to provide information such as, but not limited to distance traveled, vehicle identity, the location of the vehicle, direction of travel, or a combination thereof.

According to an object of the invention, the mileage prediction and optimization module comprises at least one of a microprocessor, a micro-controller, a memory module, a communication module, a user interface module, a display module, a monitoring means, or a combination thereof.

According to an object of the invention, the mileage prediction and optimization module comprises at least one of a personal digital assistant (PDA), an automotive navigation system, a desktop computer, a television, a projector, a cinema screen, a laptop/notebook computer, a tablet computer, a mobile phone, a smartphone, a portable electronic device, or a media player device.

According to an object of the invention, the measuring and processing module comprises at least one of a personal digital assistant (PDA), an automotive navigation system, a desktop computer, a television, a projector, a cinema screen, a laptop/notebook computer, a tablet computer, a mobile phone, a smartphone, a portable electronic device, or a media player device.

According to an object of the invention, the system is configured to provide an interface with the mileage prediction and optimization module to interact with user.

According to an object of the invention, the system is configured to optimize vehicle mileage by providing correct speed and gear combination information under standard and varying conditions.

According to another object of the invention, the system is configured to inform the user about the distance to empty, journey fuel cost, journey fuel consumption, number of fuel stations along with checked fuel density, tire air pressure monitoring stations etc., on maps.

According to another object of the invention, the system is configured to inform the user about number of fuel stations along with checked fuel density, air pressure monitoring stations etc. on route available for different speed-gear patterns before vehicle goes out of fuel.

According to another object of the invention, the system is configured to provide comparative information about fuel consumption using fuel of different densities and with varying tire air pressure in a simple method.

According to another object of the invention, the measured values (speed, fuel efficiency, gear etc.) are displayed in analogous, tabular display or other suitable form on PDA to have flexibility of placement due to easy portability of PDA (Personal Digital Assistant) e.g. smart phones, tablets etc.

According to another object of the invention, information such as, but not limited to 'fuel to empty', 'fuel stations on route before fuel in vehicle goes empty', 'upcoming Fuel stations with fuel density, air monitoring stations, garages' etc. are displayed in analogous or in tabular form on prediction and optimization module.

According to another object of the invention, the predetermined, calculated and measured information about mileage variation and other vehicle related information is communicated to the user via interface through audio instructions.

According to another object of the invention, a system is configured to display animated needle/pointer to have high reliability and easy substitution by another prediction and optimization module in case of failure.

It would be understood that any embodiments disclosed herein can be applied, when applicable, in any object of the invention, alone or in any combination.

Details of one or more implementations are set forth in the accompanying drawings and the description below. Other features, aspects, and potential advantages will be apparent from the description and drawings, and from the claims.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein:

FIG. 4B, 4C represents exemplary figures of a wired OBD scan tool and wireless OBD scan tool respectively of yet another embodiment of the present invention;

FIG. 4D represents exemplary view of cabin of a vehicle indicating few positions where an OBD diagnostic link connector can be found in yet another embodiment of the present invention;

DETAILED DESCRIPTION OF THE PREFERRED EMBODIMENT

Embodiments of the present invention are best understood by reference to the figures and description set forth herein. All the aspects of the embodiments described herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit and scope thereof, and the embodiments herein include all such modifications.

A broad framework of the principles will be presented by describing various embodiments of this invention using specific examples and represented in different figures. For clarity and ease of description, each aspect includes only a few embodiments. Different embodiments from different aspects may be combined or practiced separately, to design a customized process depending upon application requirements. Many different combinations and sub-combinations of a few representative processes shown within the broad framework of this invention, that may be apparent to those skilled in the art but not explicitly shown or described, should not be construed as precluded.

This disclosure is generally drawn, inter alia, to systems, appliances, and methods to predict and optimize the vehicle mileage. The present embodiment may use all of the components of the system or any combination thereof, to enable the system to perform the desired functions. In an exemplary embodiment of the present invention the system first measures the values of tire(s) air pressure, air temperature, Fuel volume dispensed to the fuel tank, Fuel Density, Fuel temperature which helps system to measure respective values.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
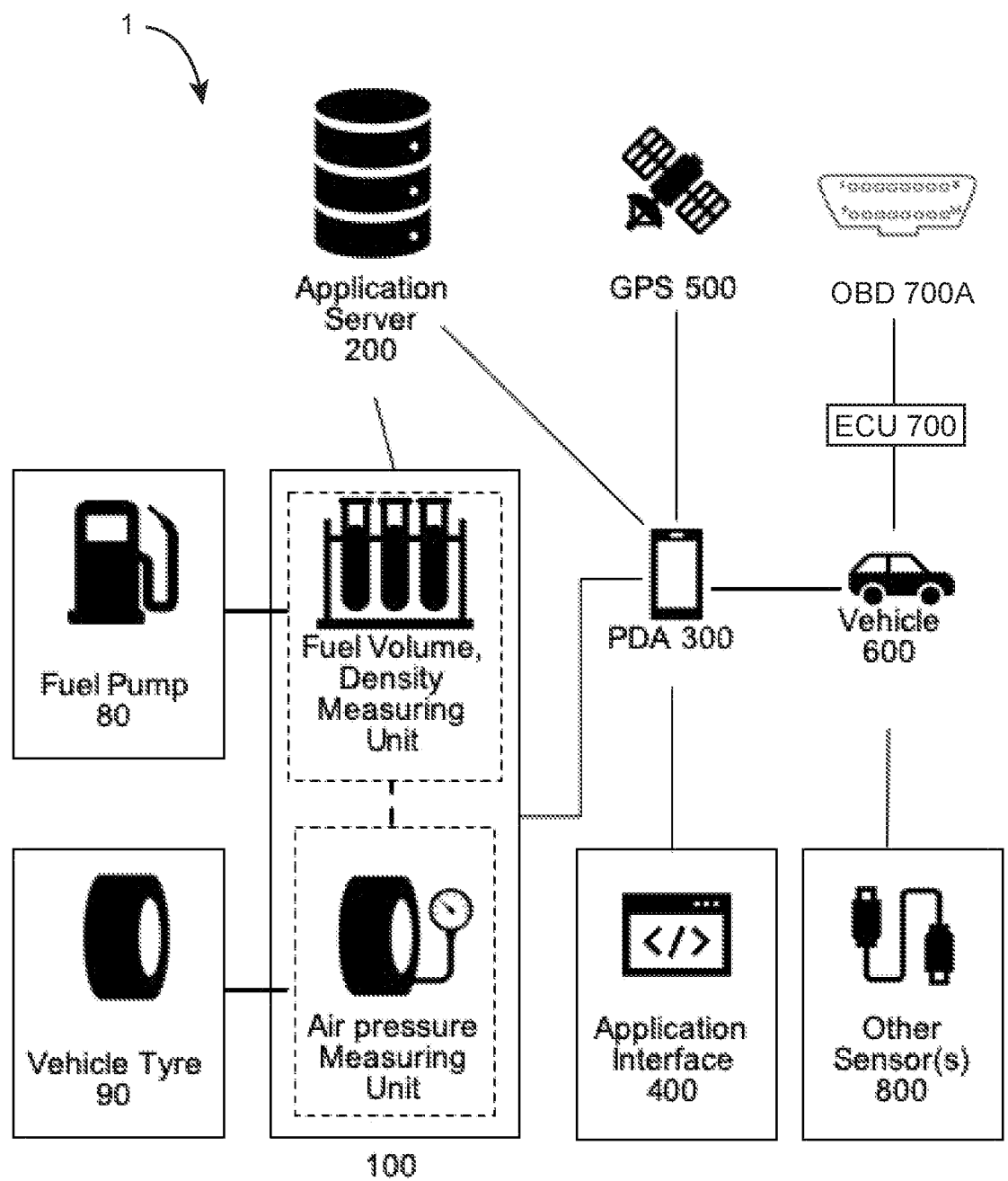
FIG. 1 schematically depicts a network architecture of Mileage Vehicle Prediction and Optimization System (prediction and optimization module) in which preferred embodiments of the present invention may be implemented.

Referring now to the figures, wherein the components are labeled with like numerals throughout the several figures, and initially referring to FIG. 1, illustrates network architecture for implementing Mileage Vehicle Prediction and Optimization System, according to an embodiment of the present subject matter. The prediction and optimization module 1 comprises one or more fuel pump(s) 80, vehicle tire(s) or other speed proportional rotating parts 90, measuring and processing module 100, an application server 200, a Personal Digital Assistant (prediction and optimization module) 300, an application interface 400 to interface with user and measuring and processing module 100, a GPS tracking system 500, an Electric Control Unit (ECU) 700, a vehicle 600 with ECU, and an OBD Diagnostic Link Connector (OBD-DLC) 700A to connect with ECU of the vehicle.

The measuring and processing module 100 measures the values of tire(s) air pressure, air temperature by collecting air sample from the vehicle tire(s) 90 and also measures fuel density, fuel temperature and fuel volume from the fuel dispensed to the fuel tank. The values measured by the measuring and processing module 100 are then transduced and processed and are sent to the application server 200 and to the prediction and optimization module 300. In another embodiment of the present invention, the prediction and optimization module 300 can communicate with the application server 200 to fetch values shared by measuring and processing module 100. In yet another embodiment of the present invention, the prediction and optimization module 300 can also communicate with the ECU 700 of the vehicle 600 through OBD-DLC 700A. The ECU 700 stores values which are then communicated to the prediction and optimization module 300 through the application interface 400 which is compatible with the protocols of the OBD 700A and ECU 700. In one embodiment of the present invention, the connection link between the ECU 700 and the prediction and optimization module 300 is established through one or more wireless connections or wired connections, for example, but not limited to bluetooth or bluetooth LE and/or Wi-Fi and/or WiMAX. In another embodiment of the present invention, the OBD interface 700A is used to connect with the ECU 700 to fetch the values stored and processed by it. In yet another embodiment of the present invention, the prediction and optimization module 300 is coupled with the GPS tracking system 500 to obtain information about the Speed, distance, position of Fuel stations, garages, air monitoring stations etc.

According to a specific embodiment of the invention, the information collected from the measuring and processing module 100, the application server 200, the ECU 700 and the GPS tracking system 500 is processed by the prediction and optimization module 300 to predict variation in the mileage of the vehicle and can help driver to optimize the mileage by minimizing variation in the mileage by driving at optimal speed and optimizing variation in tire air pressure and in fuel density to get maximum mileage from the vehicle under given scenario. In another embodiment, the prediction and optimization module 300 is configured to inform the driver about other facilities, such as, but not limited to fuel stations, garages, air monitoring stations.

According to the preferred embodiment of the invention, the prediction and optimization module 300 can communicate the required information to the driver without being the vehicle necessarily in motion, where vehicle may be in stationary or no fuel consumption state.

Figure 2:
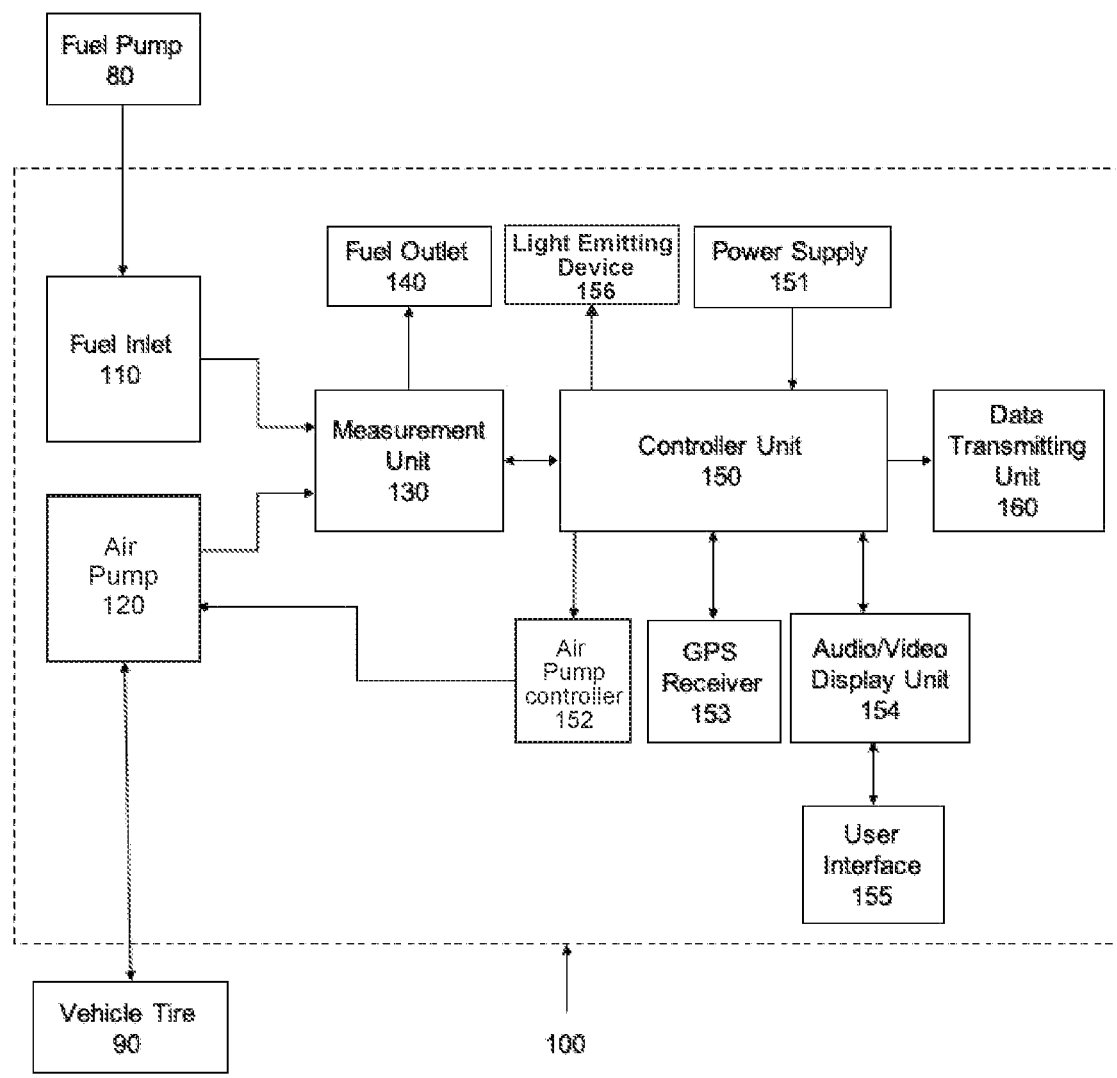
FIG. 2 illustrates a block diagram of control circuitry for the fuel level and air pressure measuring unit of FIG. 1.

Referring to FIG. 2, illustrates a simplified block diagram of the measuring and processing module 100 according to the present invention, comprises a fuel inlet vessel 110, an air pump 120, a measurement unit 130, a fuel outlet vessel 140, a controller unit 150, a power supply 151, an air pump controller 152, a GPS receiver 153, an audio/video display unit 154, a user interface 155, a light source 156 and a data transmitting unit 160. In one embodiment of the present invention, the fuel dispensed through the fuel pump 80 may enter the fuel inlet vessel 110, wherein the measurement unit 130 is configured to measure the values of the fuel volume, fuel density, and/or fuel temperature of the dispensed fuel which exits through the fuel outlet vessel 140 once the values are measured. The fuel outlet vessel 140 may further get connected to the fuel tank inlet vessel (not shown) of the vehicle. In another embodiment of the present invention, the air pump controller 152, which may be used to measure pressure and temperature of air inside the tire, can also be used to inflate or deflate the vehicle tire via the air pump 120 to optimize the variation of air pressure in the vehicle 600. The air pump controller 152, described herein, may get connected to the air pump 120, which may further be controlled by the controller 150, to complete the inflation or deflation action. The light emitting device 156 is configured to supply light brightness to illuminate a desired area of the vehicle.

Figure 2A:
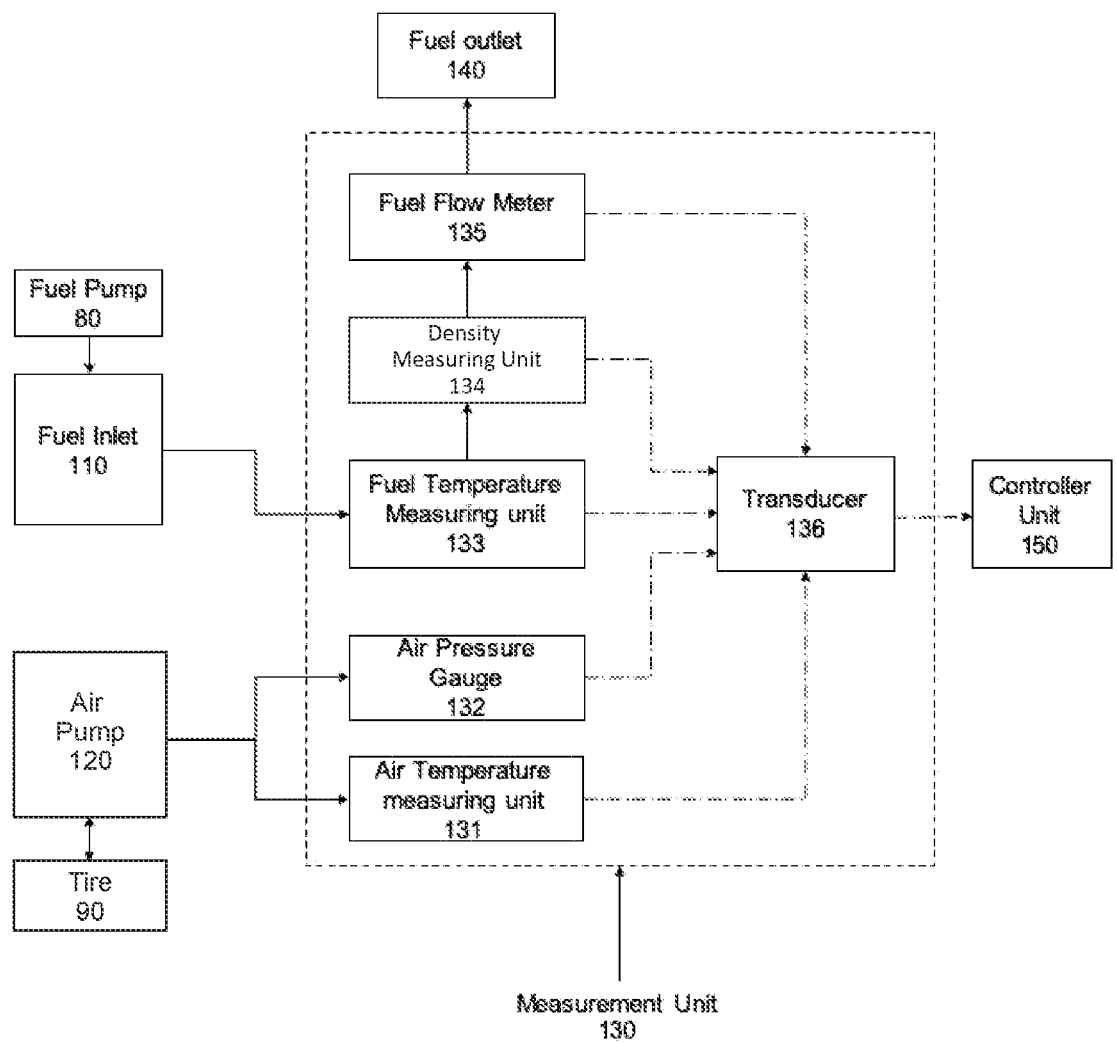
FIG. 2A illustrates a block diagram of control circuitry for the measurement unit of FIG. 2.

Referring to FIG. 2A, illustrates a simplified block diagram of the measuring unit 130 of the present invention. The measurement unit 130 may further comprise an air temperature measuring unit 131, an air pressure gauge 132, a fuel temperature measuring unit 133, a density measuring unit 134, a fuel flow meter 135 and a transducer 136. The measurement unit 130 is configured to measure the values of fuel volume, fuel density, fuel temperature, tire air pressure, tire air temperature and then to transducer and communicate the measured and processed values to the controller unit 150. The air temperature measuring unit 131, air pressure gauge 132, fuel temperature measuring unit 133, density measuring unit 134, fuel flow meter 13 may be any commercially available measuring units well known to those skilled in the art.

In preferred embodiment of the present invention, the measurement unit 130 is configured to measure the state of the vehicle, whether moving or stationary by analyzing the information of the vehicle such as, but not limited to, velocity information, transport condition, ACC igniting, starting and ending distance (for example, via GPS 500) and after obtaining the state of the vehicle, it measures the values corresponding to the fuel volume, fuel temperature, air temperature, tire air pressure or other information in accordance to the vehicle state. For example, the measurement unit 130 is configured to measure the fuel density of the vehicle when the vehicle is stationary or not in motion. Generally, when the vehicle is stationary, the fuel density may vary due to oil supply etc. So when the vehicle is not moving, the system 1 is configured to measure the variation in the fuel density to predict the variation in the mileage of the vehicle.

Figure 2B:
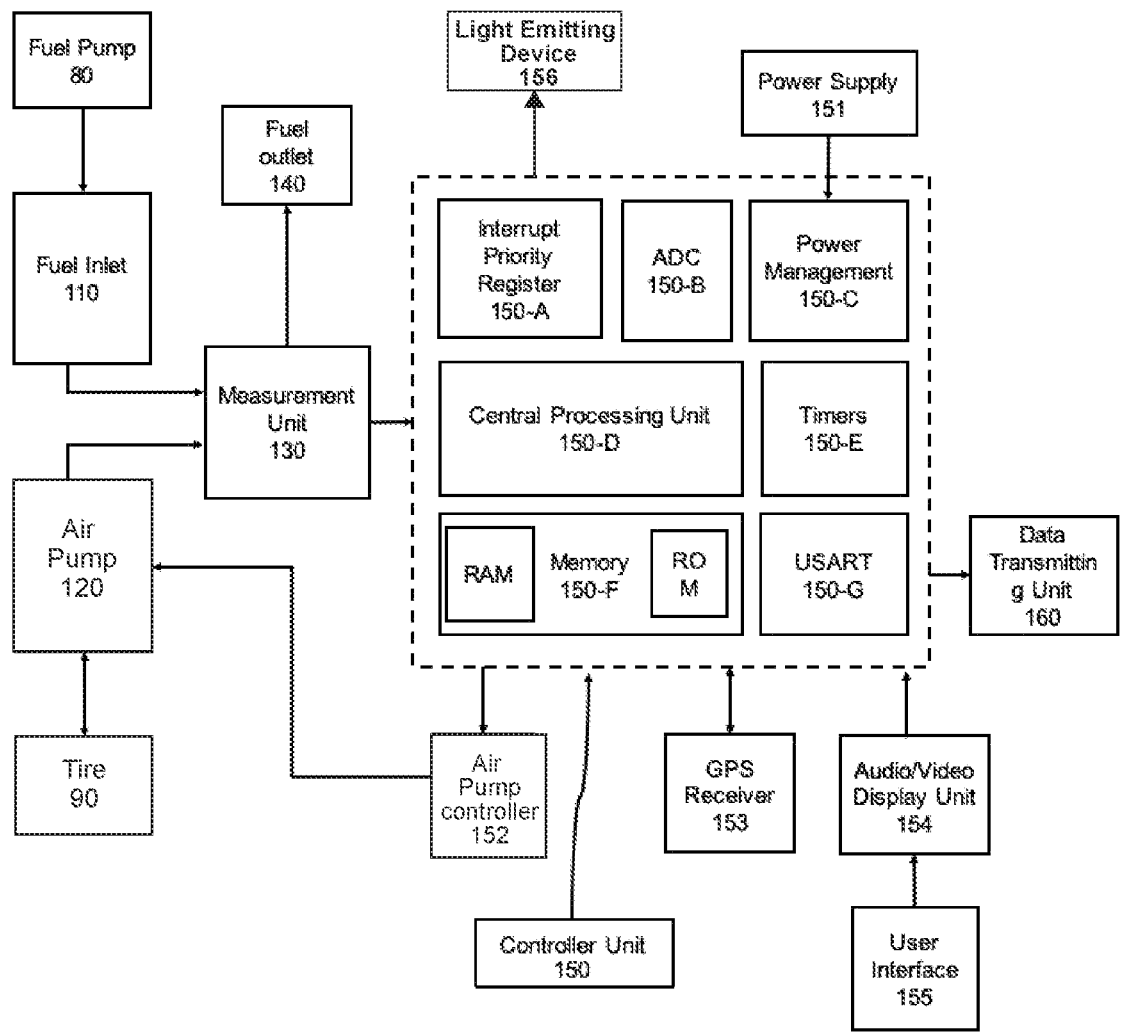
FIG. 2B illustrates a block diagram of control circuitry for the controller unit of FIG. 2.

Referring to FIG. 2B, illustrates a simplified block diagram of the controller unit 150 of present invention for controlling and processing the values measured by the measurement unit 130 and communicating it further to the application server 200 or prediction and optimization module 300 through Data transmitting unit 160, in accordance with an embodiment of a present subject matter. The controller unit 150 comprises an Interrupt Priority Register 150-A, ADC 150-B, Power Management 150-C, Central Processing Unit 150-D, Timers 150-E, Memory 150-F, USART 150-G. The controller unit 150 further comprises a Power supply 151, an air pump controller 152, a GPS receiver 153, an Audio/Video Display Unit 154 which may further comprise an user interface 155, a light Emitting device 156. The controller unit 150 may transmit the processed data through the data transmitting unit 160.

In one embodiment of the present invention, the values of fuel and air pressure measured by the measuring unit 130 may be processed by the controller unit 150 and further may be transmitted to the application server 200 (as shown in FIG. 1) and prediction and optimization module 300 (as shown in FIG. 1) using data transmitting unit 160. In another embodiment of the present invention, the air pressure of tire 90 may be measured and communicated by the measuring unit 130 to the controller unit 150, wherein the controller unit 150 may further process and control the air pump controller 52. The air pump controller 152 is further connected to the air pump 120, to inflate or deflate the tire as per the measured and processed values of Tire's 90 air pressure. In another embodiment of the present invention the controller unit 150 is attached with the GPS receiver 153, which is capable of receiving GPS data such as, but not limited to, location of fuel pumps, air pressure monitoring stations, speed of vehicle, or a combination thereof, and may use the received values to process and provide information such as predicted Mileage of vehicle at current speed, suggested gear at current speeds, no of fuel station on route before fuel goes empty, fuel station information with measured fuel density etc. In yet another embodiment of the present invention, the Audio/Video Display Unit 154 is configured to display and communicate all received, processed and communicated data to the user or operator and may also accepts inputs from the user via the user interface 155 which may further modify and process new information. The Audio/Video Display Unit 154, may display information such as, but not limited to, fuel volume, fuel density, fuel temperature, tire air pressure, tire air temperature, date and time, GPS data like fuel pumps location, air pressure monitoring stations, speed of the vehicle, predicted Mileage of vehicle at current speed, suggested gear at current speeds, no of fuel station on route before fuel goes empty, fuel station information with measured fuel density, distance to empty, or combination thereof.

Figure 2C:
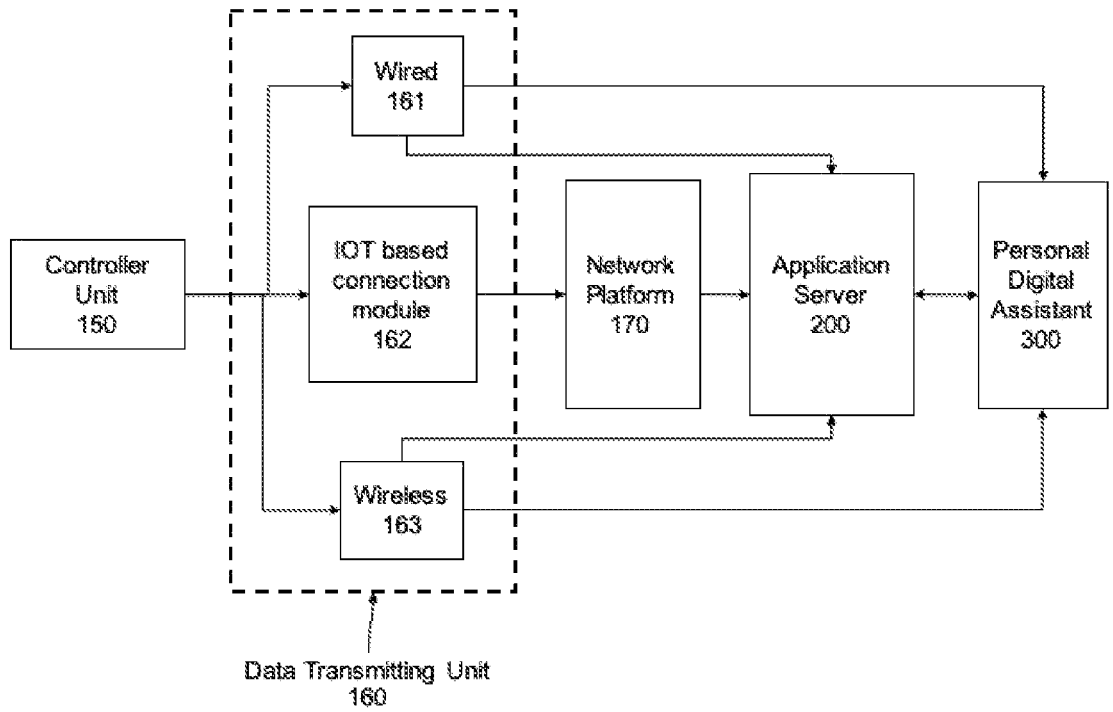
FIG. 2C illustrates implementation of IOT based Data transmitting unit of FIG. 2.

Referring to FIG. 2C, illustrates a simplified block diagram of the data transmitting unit 160 of the present invention. The data transmitting unit 160 is configured to transmit the measured and processed values of fuel and air pressure from the controller unit 150 to the application server 200 and the prediction and optimization module 300. In one embodiment of the present invention, the operable connection between the data transmitting unit 160 and the application server 200 and the prediction and optimization module 300 may be a wired connections such as, but not limited to, ethernet, coaxial, fiber optic, or any suitable wired standard and protocols. In another embodiment of the present invention, the operable connections may be wireless such as, but not limited to, cellular, satellite, Bluetooth, microwave, WiFi, other RF spectrum, IR, UV, optical, or any other suitable wireless standards and protocols. In yet another embodiment of the present invention, the prediction and optimization module 300 and the application server 200 are connected to the data transmitting unit 160 via the internet, intranet, communication network, a cloud based system, or combination thereof.

Figure 2D:
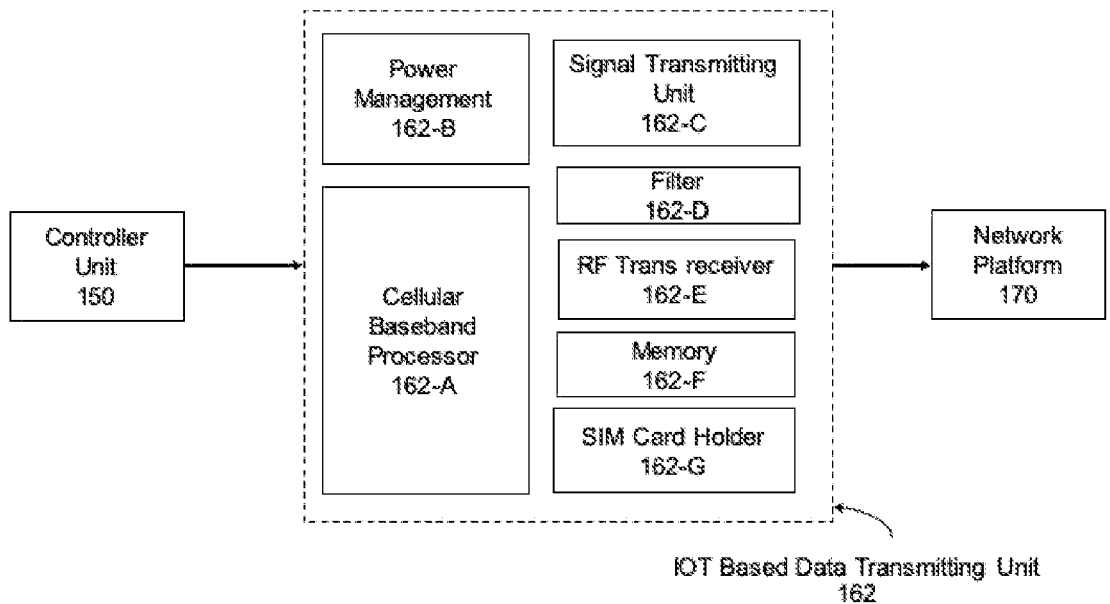
FIG. 2D illustrates a block diagram of control circuitry for the IOT based Data transmitting unit.

In preferred embodiment of the present invention, the data transmitting unit 160 may be configured as Internet Of Things (IoT) based transmitting unit 162 (as shown in FIG. 2D). The internet of things equipment is electrically connected to the network platform 170, in communication with the prediction and optimization module 300 and the application server 200 and located at a base location of the vehicle. Additionally, by use of wireless communication method such as LoRaWAN (a Low Power Wide Area Network/LPWAN protocol), LTE-M, LTE-MTC, narrowband IoT (NB-IoT), Dedicated Short Range Communications (DSRC), and others, the controller unit 150 could communicate with prediction and optimization module 300 and the Application server 200. In another embodiment of the present invention, the controller unit 150 could communicate with other components of the system such as the electronic control unit (ECU) 700, other sensors, transmitter, or a combination thereof.

Figure 3:
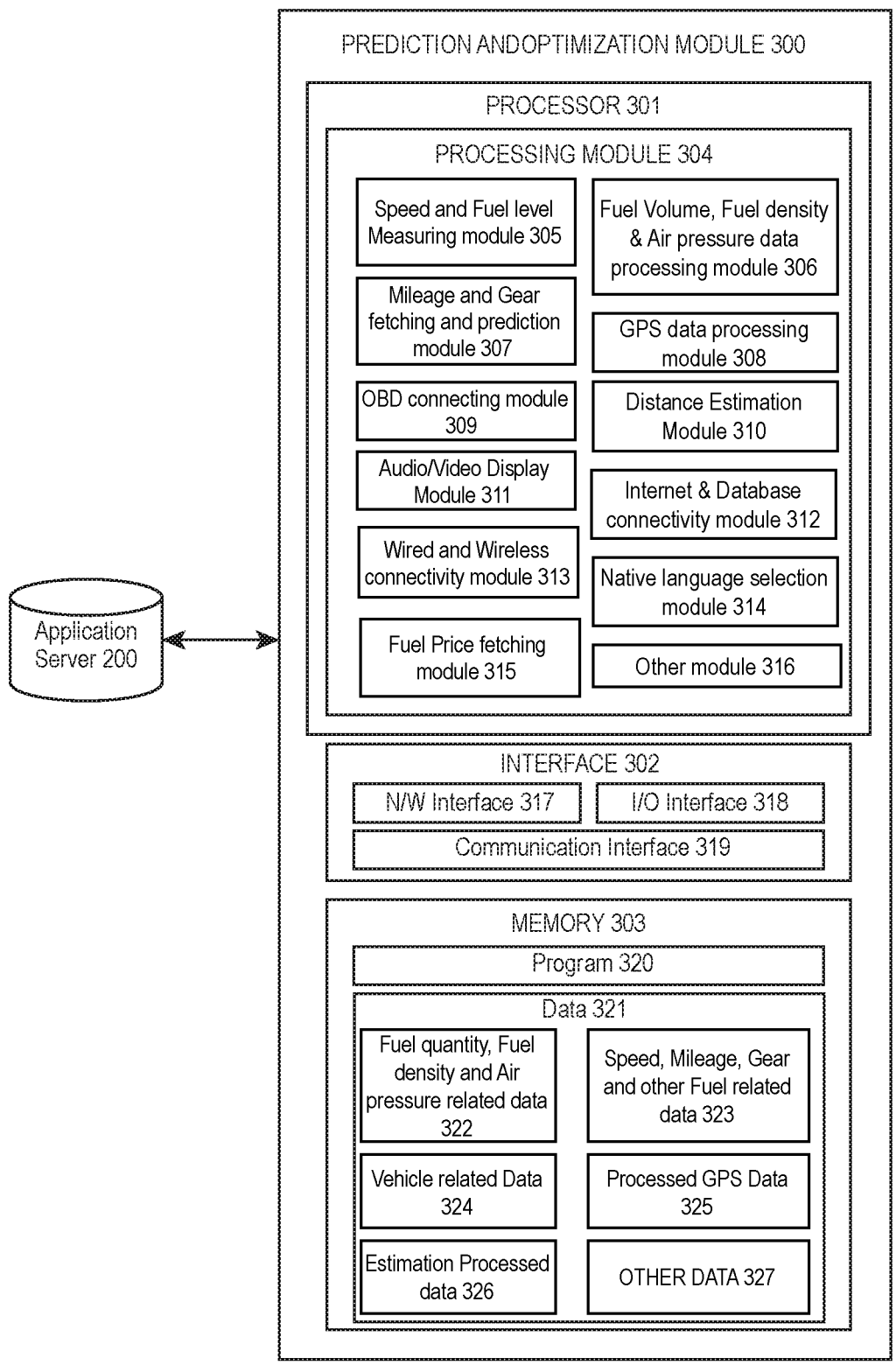
FIG. 3 illustrates a computing system for implementing the preferred embodiment of the present invention.

FIG. 3 schematically shows a block diagram of an illustrative example of the prediction and optimization module 300 for facilitating the prediction and optimization of mileage of the vehicle. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof. The system components may be provided by one or more server computers and associated components.

The prediction and optimization module 300 may comprise one or more processor(s) 301, one or more network interface(s) 302, and a memory 303. In one embodiment of the present invention, the prediction and optimization module 300 may be a general purpose computer, a mainframe computer, or a combination thereof. In another embodiment of the present invention, the prediction and optimization module 300 may be configured as a personal digital assistant (PDA), an automotive navigation system, a desktop computer, a television, a projector, a cinema screen, a laptop/notebook computer, a tablet computer, a mobile phone, a smartphone, a portable electronic device, a media player device and/or other device that can be used to interact with the system 1 for performing prediction and optimization of mileage. In yet another embodiment of the present invention, the prediction and optimization module 300 may be configured as a particular apparatus, system, and the like based on the one or more operations performed. In yet another embodiment of the present invention, the prediction and optimization module 300 may be a part of a subsystem of a larger system or may be standalone device.

The processor(s) 301, may be implemented as one or more microprocessors, microcomputers, microcontrollers, digital signal processors, central processing units, logic circuitries, and/or any devices that manipulate signals based on operational instructions. Among other capabilities, the processor(s) 301 is configured to fetch and execute computer-readable instructions stored in the memory 303. The processor 301 may comprise one or more processing modules 304. The one or more processing modules 304 may comprise a Speed and fuel level measuring module 305, a Fuel volume, Fuel density & Air pressure data processing module 306, a Mileage and Gear fetching and prediction module 307, a GPS data processing module 308, an OBD connecting module 309, a Distance estimation module 310, an Audio/Video Display Module 311, an Internet & database connectivity module 312, a Wired and Wireless connectivity module 313, a Native language selection module 314, a Fuel price fetching module 315 and other module(s) 316. The one or more processing module(s) 304 amongst other things, include routines, programs, objects, instructions stored in the memory 303 components, data structures, etc., which perform particular tasks or implement particular abstract data types. The one or more processing module(s) 304 may also be implemented as, signal processor(s), state machine(s), logic circuitries, and/or any other device or component that manipulate signals based on operational instructions. In another aspect of the present subject matter, the one or more processing module(s) 304 may be a computer-readable instructions which, when executed by a processor/processing unit, perform any of the described functionalities.

The one or more interface(s) 302 may comprise a Network interface(s) 317, an I/O interface 318, and/or a communication interface 319. The network interface 317 allows the prediction and optimization module 300 to connect to various other devices attached to the network. The I/O interface 318 is configured to connect various input and output devices (e.g., keyboard, mouse, displays, printers, speakers, etc.) to the prediction and optimization module 300. The I/O interface 318 is used to receive input from the user and present output to the user, using audio, video, and/or motion. The I/O interface 318 provides Graphical User Interface (GUI) to display the relevant information on the display, as described herein. In one embodiment of the present invention, the I/O interface 318 allows the user to browse through the displayed information. Additionally, the communication interface 319 is configured to communicate with other machines, subsystems, sensors and devices, such as other components of the system 1 to facilitate multiple functionality. The communication functions can be facilitated through one or more wireless communication systems such as, but not limited to radio frequency and/or infrared receivers and transmitters. The communication interface 319 may be designed to operate over a network such as, but not limited to, a GSM network, a GPRS network, an EDGE network, a Wi-Fi or WiMax network, a Bluetooth network, a LoRaWAN (a Low Power Wide Area Network/LPWAN protocol), a Dedicated Short Range Communications (DSRC).

The Memory 303 configured to store instructions used by one or more processing modules 304 to perform operations related to disclosed embodiments. For example, the memory 303 may be configured with one or more software instructions, such as program(s) 320 that may perform one or more operations, wherein the programs may include a single program or multiple programs. The disclosed embodiments are not limited to separate programs or computers configured to perform dedicated tasks. The memory 303 may also store data 321 that may reflect any type of information in any format that the system may use to perform operations consistent with the disclosed embodiments. For example, the data 321 may comprise fuel quantity, fuel density and air pressure related data 322, speed, mileage, gear and other fuel related data 323 which may include fuel price as per the users location fetched using GPS Data processing module 308. The data 321 may also comprise such as, but not limited to, vehicle related data 324, processed GPS data 325, estimation processed data 326 and other data 327. The other data 327 amongst other things, may serve as a repository for storing data that is processed, received, or generated as a result of the execution of one or more processing modules 304. Although the data 321 is shown internal to the prediction and optimization module 300, it may be understood that the data 321 can reside in an external repository, such as cloud server (not shown), which may be coupled to the prediction and optimization module 300. Further, the prediction and optimization module 300 is in communication with the application server 200 through the interface(s) 302 to obtain information from the pre-stored data.

Referring to the one or more processing module(s), the speed and fuel level measuring module 305 receives information about the speed of the vehicle and the fuel left in the vehicle. In one embodiment of the present invention, the information of speed and the fuel left is received through ECU 700 directly or by using an OBD scan tool 700A. In another embodiment of the present invention, the speed and fuel level measuring module 305 can also receive information about the speed and the fuel level through the speed sensor(s) and the fuel level sensor(s) respectively, already available in the vehicle or by installing new sensor(s) in the vehicle. In yet another embodiment of the present invention, the speed and fuel level measuring module 305 can also establish a contact with the GPS system 500 to receive information about the speed of the vehicle. In yet another embodiment of the present invention, the speed and fuel level measuring module 305 may also access the speed and fuel level data through internet and database connectivity module 312 in case if installed sensor(s) transmit values to database directly. The speed and fuel level measuring module 305 stores the received data in the Speed, Mileage, Gear and other Fuel related data 323. The speed and fuel measuring module 305 can either connect with speed and fuel level sensor(s) directly using other module 316 or it can process the information accessed by an OBD scan tool 700A using OBD connecting module 309. OBD scan tool 700A can be connected through wired or wireless mediums, such as Bluetooth, wi-fi, infra, radio etc.

The fuel volume, fuel density & air pressure data processing module 306 receives information about the fuel volume dispensed by pump in the fuel tank by fetching values of fuel flown the measuring and processing module 100 and store the fetched data in the fuel quantity, fuel density and air pressure related data 322. In one embodiment of the present invention, the module 306 may fetch values of fuel flown from the measuring and processing module 100 by using wired and wireless connectivity module 313. In another embodiment of the present invention, the module 306 may fetch values of fuel flown from application server database 200 by using internet and database connectivity module 312, if measured values are stored on application server 200. In yet another embodiment of the present invention, the module 306 may also fetch values of fuel volume dispensed by communicating directly with the fuel level measuring sensor(s) already installed in the vehicle, using other module 316. In yet another embodiment of the present invention, the module 306 may also fetch values of fuel volume dispensed by communicating with the ECU 700 of the vehicle to get these values via OBD connecting module 309. In yet another embodiment of the present invention, the module 306 may also fetch values of fuel volume dispensed by using GPS data processing module 308. In yet another embodiment of the present invention, the module 306 can also fetch other related values such as, but not limited to, fuel density, fuel temperature, tire air pressure, tire air temperature, time and date, fuel station through above mentioned means.

The Mileage and Gear fetching and prediction module 307 obtains the stored values from the data module 322 and 323 and then use the obtained values to estimate the variation in mileage of the vehicle with respect to speed, predetermined mileage and gear combination. In one embodiment of the present invention, the module 307 can also fetch the required information from the application server 200 by using internet and database connectivity module 312. In another embodiment of the present invention, the module 307 along with distance estimation module 310 can display the estimated information about the speed, gear, mileage variation and distance to empty on the display module 311. In yet another embodiment of the present invention, the speed and fuel level measuring module 305 along with the mileage, Gear fetching and prediction module 307 and the distance estimation module 310 are configured to calculate the time to reach destination at different speeds. In yet another embodiment of the present invention, the mileage, Gear fetching and prediction module 307 may also use GPS data processing module 308 to estimate time to reach as per current traffic condition on route. The GPS processing module 308 is capable of receiving the position coordinates and checking speed of the communicating device on the regular basis.

In yet another embodiment of the present invention, the user inserts the desired location on the prediction and optimization module 100 through the application interface 400. Based on the inserted information the GPS data processing module 308 along with mileage, Gear fetching and prediction module 307 and the distance estimation module 310 determines the number of fuel stations on the selected path and displays the information on the display module 311. Further, the mileage, Gear fetching and prediction module 307, GPS data processing module 308 and the distance estimation module 310 can determine how many numbers of fuel stations, Air monitoring stations, and other such required places like hospitals, restrooms, washrooms, restaurants etc. are reachable before the fuel goes empty.

The OBD connecting module 309 comprises an On Board Diagnostics (OBD), an enhanced diagnostics monitor which is built into the ECU. When connected with OBD scan tool, it is designed to detect electrical, mechanical and chemical failures in the vehicle emission control system that might affect vehicle emission control system. To connect with the OBD present in the ECU a scan tool 700A or a computing device with an OBD software interface is required. Data from OBD Diagnostic Link Connector can be received using a certain set of protocols, these required protocols are available in OBD connecting module 309. It may be appreciated that the protocols of OBD are changed to provide an improved diagnostic of the vehicle.

The Distance estimation module 310 receives the Fuel quantity, speed, pre-determined mileage, estimated variation in mileage and other fuel related data stored in data module 322 and 323 respectively and estimates the distance covered by the vehicle. It also estimated variation in distance covered by the vehicle with respect of speed and gear combination by using speed vs. mileage vs. gear data under standard and variable conditions.

The Audio/Video Display module 311 is where any commercially available display is capable of displaying textual, graphical images, videos and audio module is any commercially available speaker which can play any required type of audio. The display module 311 may include the display such as a liquid crystal display (LCD), a light emitting polymer display (LPD), or the like, for displaying content (e.g., Speed and Mileage and gear values, maps, instructions and the like, etc.) to the operator. In one embodiment of the present invention, the display module 311 may also be configured as an input device for receiving commands from the operator to be processed by the measuring and processing module 100. In one embodiment of the present invention, the display 311 may include a touch sensitive layer on the screen that is configured to receive input from the user. In another embodiment of the present invention, the operator may interact with the virtual keyboard or keypad displayed on the display module 311 via a finger, stylus, etc. In yet another embodiment of the present invention, the display module 311 further comprises an audio module capable of receiving audio or voice instructions from the operator. In yet another embodiment of the present invention, the display module 311 is further capable of receiving motion, and/or haptic output instructions from the operator.

The Internet and database connectivity module 312 can be used to connect to the internet and the application server 200 to fetch and receive the information required for the proper working of the prediction and optimization module 300. In one embodiment of the present invention, where the application server 200 is not stored in the local hardware but is stored on some other location like cloud, the prediction and optimization module 300 may connect with the application server 200 through internet. In another embodiment of the present invention, the Internet and database connectivity module 312 connects with the application server 200 via a communication link may be a wireless network such as, but not limited to, radio, Bluetooth, infrared, Wi-Fi. In another embodiment of the present invention, the communication link may be a wired network such as, but not limited to, fiber optics, telephone network, internet network, or a combination thereof.

The Native Language selection module 314 is used to communicate information to the operator in its native language. In one embodiment of the present invention, the native language can be selected by using native location of user which can be determined using GPS data processing module 308 and can also be accessed using other module 316 where user may store this information itself into the system by communicating with the system through the Audio/video display module 311. In another embodiment, native location of user may also be fetched using other module 316 where prediction and optimization module may access location provided by network service provider. In another embodiment, the native language selection may be as per user's choice where information about user's native language can be stored in other data 327.

The Fuel price fetching module 315 may fetch current or previous fuel prices from the internet or the application server 200 using module 312 and can store received data in data module 323. The received information along with data in modules 322, 323, 324, 325, 326, 327 can process and estimate information like cost per trip, cost of fuel per unit distance, variation in cost with change in driving speed of vehicle etc.

The other module(s) 316 may include programs, coded instructions and/or standard data of supplement applications or functions performed by the prediction and optimization system 300. The other module(s) 316 may also include programs and codes to receive information about the other vehicle related parameters such as, but not limited to, vehicle load, AC ON/OFF, instantaneous mileage, tire air pressure etc through the OBD or the sensor(s) already available in the vehicle or by installing new sensor(s) in the vehicle.

Although various processing modules disclosed above are in a separate and sequential manner, one of the skilled in the art person would understand that different type of processing can be combined in any applicable manner. For example, in one embodiment of the present invention, the module 307 can be combined in one processing step with the module 310 and 311. In another embodiment of the present invention, the processing module 305, 307, 308, 310 can be combined in one processing step. In yet another embodiment of the present invention, the processing module 307, 310, 311 can be combined. In yet another embodiment of the present invention, the processing module 307 and 310 may be combined. It is also possible to skip one or more processing module and obtain values directly communicated to the Application server database 200 via the data transmitting module 160.

Figure 4:
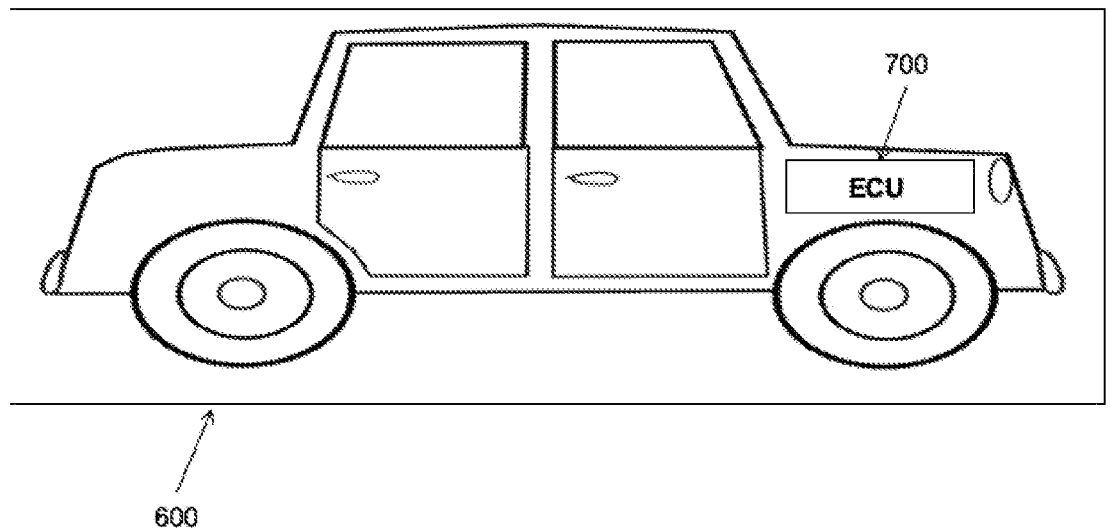
FIG. 4 illustrates an exemplary system of a vehicle fitted with an electrically controlled engine of another embodiment of the present invention.

FIG. 4 displays an exemplary diagram of one suitable vehicle 600 fitted with the Electric Control Unit (ECU) 700. The ECU is coupled with various sensors fitted inside the vehicle.

Figure 4A:
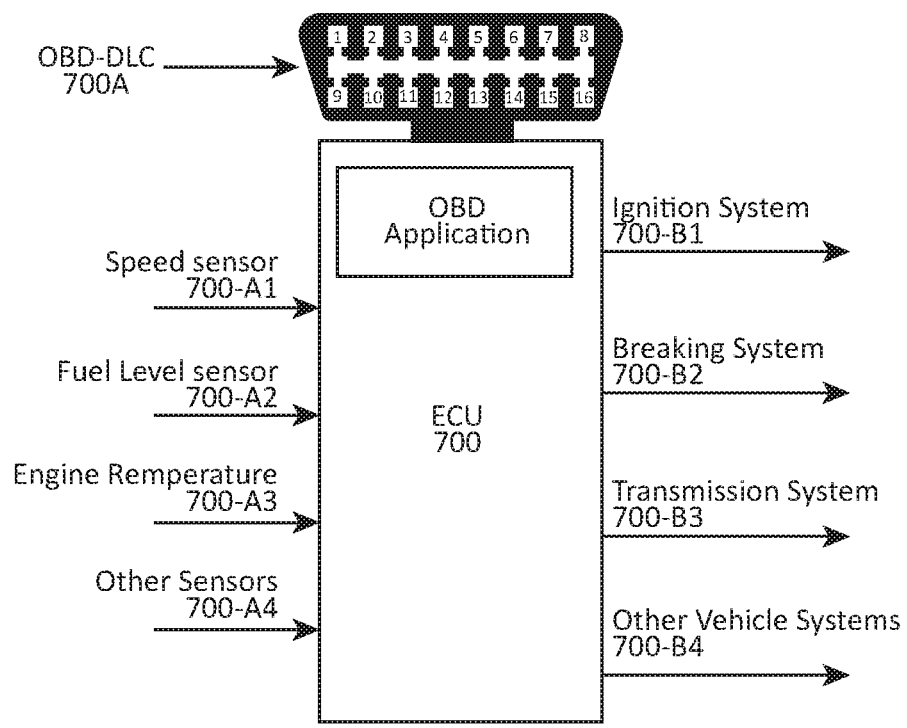
FIG. 4A schematically depicts architecture of Electric Control Unit (ECU) of yet another embodiment of the present invention.

FIG. 4A schematically depicts architecture of ECU 700 according to an embodiment of the present subject matter. In one embodiment of the present invention, the ECU 700 controls a series of actuators on an internal combustion engine to ensure optimal engine performance. The ECU 700 reads values from multiple sensors within the engine bay and interprets the data using multidimensional performance maps and adjusts the engine actuators accordingly. Various sensors fitted in the vehicle are speed sensor(s) 700-A1, fuel level sensor(s) 700-A2, engine temperature sensor(s) 700-A3 and other sensor(s) 700-A4. An actuator is a component of a machine that is responsible for moving or controlling a mechanism or system. Non-limiting examples of various systems controlled by an actuator are Ignition system 700-B1, braking system 700-B2, transmission system 700-B3 and there exists various other vehicle systems system 700-B4 which need to be controlled. The OBD is an enhanced diagnostics monitor which is built into the vehicle's ECU. All vehicle manufactures provides a basic amount of serial data and that data will be available by connecting the OBD scan tool to a standard OBD Diagnostic Link Connector 700A (OBD-DLC) via an OBD application. The number of pins on OBD-DLC is standardized depending upon the protocol of OBD used. For example, OBD 2 DLC has standard 16 pins. Earlier models of vehicles had OBD1 protocol. It may be appreciated that the protocols of OBD are changed to provide an improved diagnostics of the vehicle. The scope of this invention is should not be limited by the present protocol of OBD being in use.

FIG. 4B represents an exemplary figure of a wired OBD scan tool with a 16 pin OBD-DLC 700A according to one embodiment of the present invention. It is a scan tool for OBD with essential scanner software interface. It lets the user to retrieve vital information that can help in diagnose problems. FIG. 4C represents an exemplary figure of a wireless OBD scan tool with a 16 pin OBD-DLC 700A according to another embodiment of the present invention. The wireless OBD scan tool may need an additional computing system with essential OBD scanner software interface. The prediction and optimization module 300, for example PDA is one of the suitable computing systems which when equipped with essential OBD scanner software interface can receive and store vital information from OBD and can use the stored information to perform other operations.

FIG. 4D represents an exemplary view of the cabin of the vehicle 600. It indicates few positions where an OBD-DLC 700A can be found. In one embodiment of the present invention, OBD-DLC 700A could be located behind the ashtray. In another embodiment of the present invention, OBD-DLC 700A could be located near center of dashboard or it could also be located near left corner of dashboard. In yet another embodiment of the present invention, OBD-DLC 700A could be located on the driver's side of cabin below the dashboard. It would be appreciated that the scope of this invention is not limited by the location of the OBD-DLC in a vehicle.

Figures 5A, 5B:
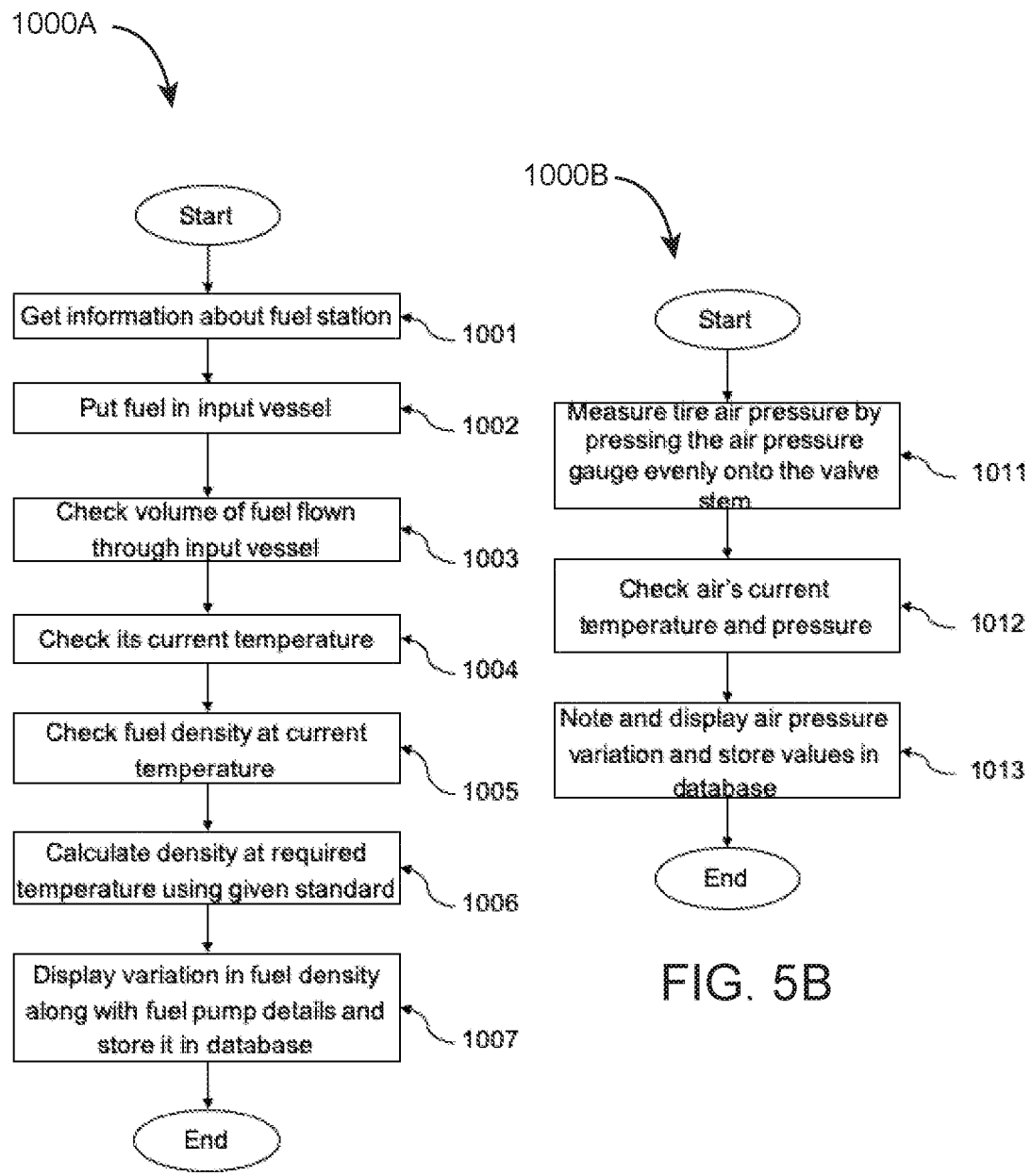
FIGS. 5A, 5B, 5C, 5D, and 5E illustrates methods for embodying aspects of the present subject matter, in accordance with an embodiment of the present subject matter.

FIG. 5A schematically shows an example flow diagram of a method 1000A to check and measure density of fuel arranged in accordance with at least some embodiments described herein.

Method 1000A may be implemented in a system such as the system shown in FIG. 1. Method 1000A may include one or more operations, actions, or functions as illustrated by one or more of blocks 1001, 1002, 1003, 1004, 1005, 1006, and/or 1007. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof.

At block 1001, the prediction and optimization module 300 may fetch information about the fuel station from where the fuel has been dispensed. In one embodiment of the present invention, the prediction and optimization module 300 may receive this information using the GPS. In another embodiment, the user or operator may enter the required information manually. At block 1002, the user or operator may put fuel in the input vessel of the prediction and optimization module 300 to further measure its embodied parameters. At block 1003, the prediction and optimization module 300 measures the volume of fuel flown through the input vessel by using any available volumetric flow meter. At block 1004, the prediction and optimization module 300 measure the temperature of fuel flown through the input vessel by using any available temperature check meter. At block 1005, the prediction and optimization module 300 measure the density of fuel flown through the input vessel at present temperature by using any available density check meter. At block 1006, the prediction and optimization module 300 calculates density of the fuel and required temperature, if different than present values. In one embodiment of the present invention, the prediction and optimization module 300 can do this calculation using predefined algorithms or may get the values by using information from database. At block 1007, the prediction and optimization module 300 may compares the measured density of the fuel and predefined density of fuel at required temperature, and displays the values to the user along with the fuel pump details. In an embodiment of the present invention, the prediction and optimization module 300 also can store the values in the application server 200 using communication network.

FIG. 5B schematically shows an example flow diagram of a method 1000B to check and measure air pressure of tire arranged in accordance with at least some embodiments described herein.

Method 1000B may be implemented in a system such as the system shown in FIG. 1. Method 1000B may include one or more operations, actions, or functions as illustrated by one or more of blocks 1011, 1012, and/or 1013. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof.

At block 1011, the prediction and optimization module 300 measures the tire air pressure by pressing the air pressure gauge evenly onto the valve stem of the tire. At block 1012, by pressing the air pressure gauge, the air flows into the air pressure gauge and it measures current temperature and pressure of the air inside the tire. At block 1013, the prediction and optimization module 300 compares air pressure of the tire at present temperature and pressure with required temperature and pressure of tire. In one embodiment of the present invention, the prediction and optimization module 300 calculates using predefined algorithms or may get the values by using information from the database. The prediction and optimization module 300 may display the original and compared values to the user along with the air monitoring station details. Additionally, the prediction and optimization module 300 may store the values in the application server 200 using communication network.

Figures 5C, 5D:
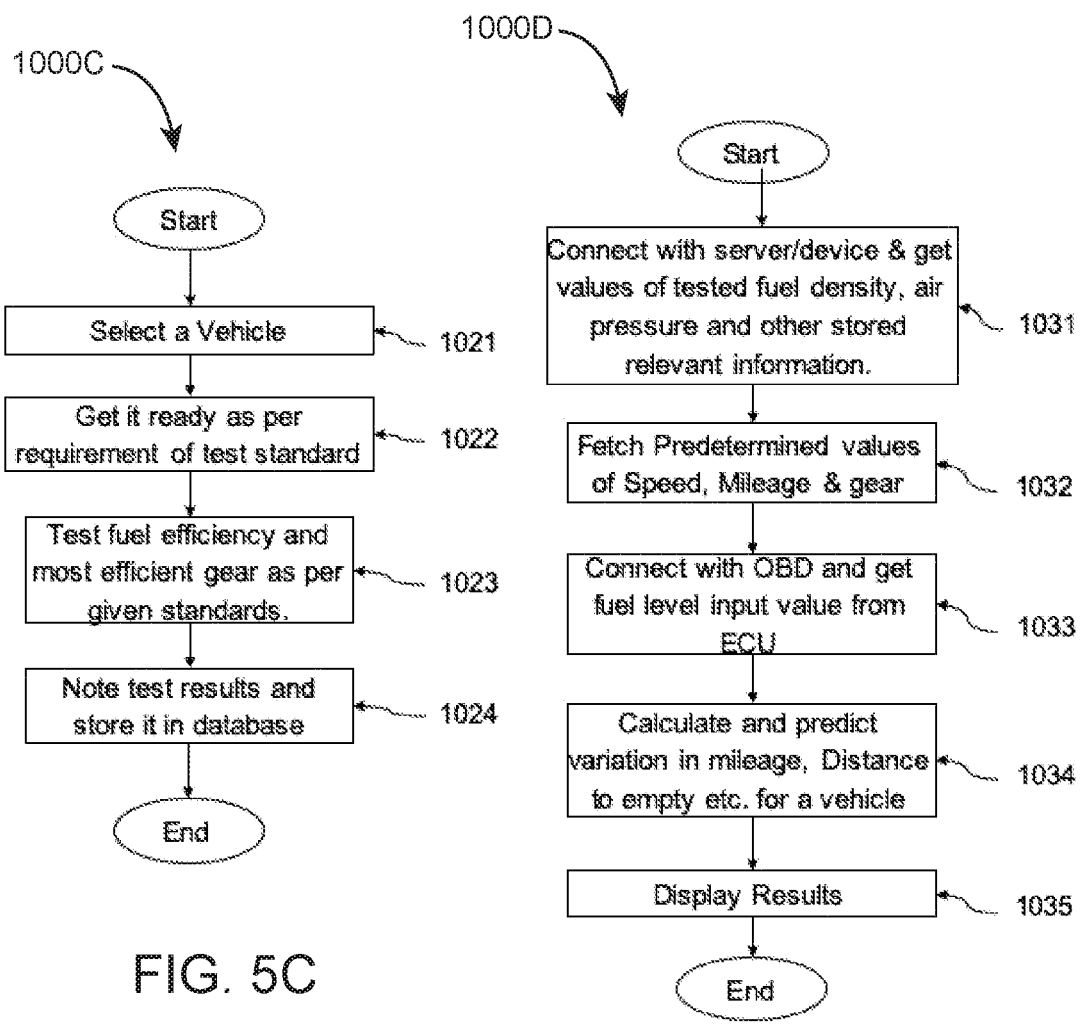

FIG. 5C schematically shows an example flow diagram of a method 1000C to check or calculate the values of fuel efficiency and most efficient gear to be used at different speeds for a particular vehicle in accordance with at least some embodiments described herein.

Method 1000C may be implemented in a system such as the system shown in FIG. 1. Method 1000C may include one or more operations, actions, or functions as illustrated by one or more of blocks 1021, 1022, 1023, and/or 1024. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof.

At block 1021, initially the user can select a vehicle for which the values are needed to be calculated. After selecting the vehicle, at block 1023, the user or operator may follow the standard instructions and given parameters to test its fuel efficiency and most efficient gear at different speeds. In one embodiment of the present invention, to check the fuel efficiency of a vehicle at constant speeds, the user may follow the standards defined by an authoritative body or an organization or it may be self-defined and the gear values can be checked by using same or some another standard method defined for checking correct gear values. After performing the tests as per the standard, the user may note down the test results and may upload the values on the application server 200 (at block 1024). This exemplary method of checking fuel efficiency and gear describe here may not considered as the only method for checking fuel efficiency and gear for a vehicle. The person skilled in art or may find other ways test values of fuel efficiency and correct gear for a vehicle at different speeds. But this doesn't limit the scope of this invention.

FIG. 5D schematically shows an example flow diagram of a method 1000D calculate and predict variation in mileage in accordance with at least some embodiments described herein.

Method 1000D may be implemented in a system such as the system shown in FIG. 1. Method 1000D may include one or more operations, actions, or functions as illustrated by one or more of blocks 1031, 1032, 1033, 1034, and/or 1035. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof.

At block 1031, the prediction and optimization module 300 may connect with the server or device and fetch values of tested fuel density, air pressure and other stored relevant information like fuel volume, air temperature etc. At block 1032, the prediction and optimization module 300 is configured to fetch the predetermined values of speed, mileage and gear about the vehicle. At block 1033, the prediction and optimization module 300 is configured to connect with OBD to get fuel level input value of the vehicle. At block 1034, by using the above fetched values, the system calculates and predicts the variation in mileage at least based on the fuel volume, speed, fuel density, tire air pressure, tire air temperature, fetched values from the ECU module and the pre-defined mileage data of the vehicle. Additional information such as, but not limited to distance to empty, locations of vehicle air monitoring stations, hospitals, garages, washrooms, restaurants, corresponding to different routes those are reachable before the fuel goes empty, distance traveled, vehicle identity, the location of the vehicle, direction of travel and display results at block 1035. Example of this information at block 1035 is given in FIGS. 6D-6K and FIG. 6N.

Figure 5E:
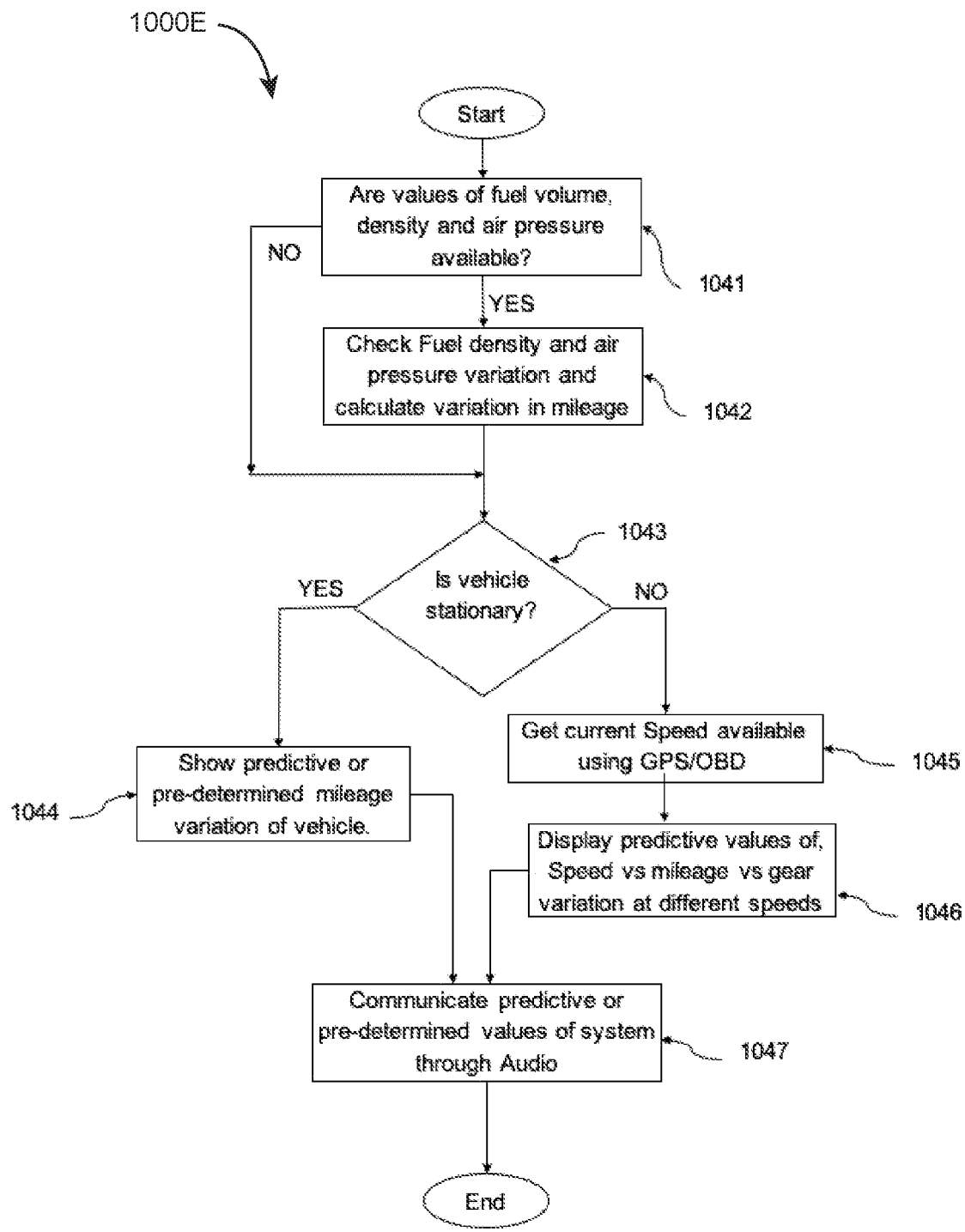

FIG. 5E schematically shows an example flow diagram of a method 1000E calculate and predict variation in mileage and other related information in accordance with at least some embodiments described herein.

Method 1000E may be implemented in a system such as the system shown in FIG. 1. Method 1000E may include one or more operations, actions, or functions as illustrated by one or more of blocks 1041, 1042, 1043, 1044, 1045, 1046 and/or 1047. Although illustrated as discrete blocks, various blocks may be divided into additional blocks, combined into fewer blocks, or eliminated, depending on the desired implementation. In some further examples, the various described blocks may be implemented as a parallel process instead of a sequential process, or as a combination thereof.

At block 1041, the prediction and optimization module 300 checks if the values of fuel volume, density and air pressure available. If No, then system goes directly at block 1043. If Yes, then system goes to block 1042 where it calculates the variation in mileage as per current fuel density and air pressure. At block 1043 the prediction and optimization module 300 determines if the vehicle is moving or is stationary. In preferred embodiment of the present invention, at block 1043 the vehicle state is determined. To precisely compute, predict and optimize the mileage values of the vehicle, it is necessary that the data values stored or fetched by the prediction and optimization module 300 should be precise which are dependent on the vehicle state. For example, when the vehicle is stationary, the fuel density may vary due to the change in fuel temperature or the oil supply, and the tire air pressure may vary due to total load of the vehicle. Therefore, if the vehicle is stationary for more than a predetermined time, the data is considered before the prediction and optimization of the mileage and other related data is performed.

If vehicle is stationary then it jumps to block 1044 where the prediction and optimization module 300 shows the pre-determined or predictive mileage variation of vehicle and gear as calculated at block 1042. At block 1043, If vehicle is not stationary or is moving with some speed, then it goes to block 1045 where the prediction and optimization module 300 determines the current speed of the vehicle using GPS, OBD or may use any other means to get the speed values. After this the prediction and optimization module 300, at block 1046, displays pre-determined or predictive mileage variation and gear of vehicle with respect to current speed as calculated in step 1042. At block 1046, the prediction and optimization module 300 is also capable of displaying pre-determined or predictive mileage variation and gear of the vehicle for combination of speeds as illustrated in exemplary FIGS. 6H-6K. At block 1047, the prediction and optimization module 300 can Communicate predictive or pre-determined values of the system through audio means. In one exemplary embodiment of the present invention, if a user or operator is driving the vehicle and wants to get the above discussed information without looking at the display module, then in this case the prediction and optimization module 300 can communicate the required information through audio or voice. In another exemplary embodiment of the present invention, if a user or operator is using some other application in the prediction and optimization module (i.e. PDA) and also wants to get the above discussed information, then in this case the prediction and optimization module 300 can communicate the required information through pop-up display or audio or combination of both.

Figure 6A:
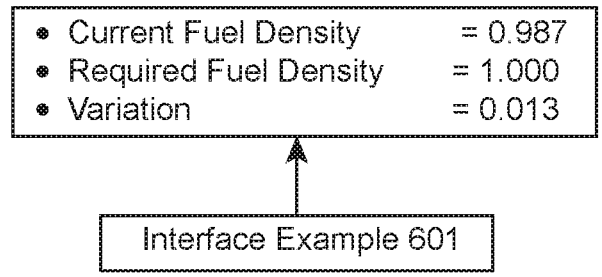
FIGS. 6A-6N illustrates an exemplary method to represent various embodiments of the present invention.

FIG. 6A represents an exemplary interface 601 of one of the embodiments of the present invention, here the fuel density of fuel flown through the fuel inlet 110 (as shown in FIG. 2A) of the prediction and optimization module 300 has been measured by the system and is displayed on Audio/video display module attached with the present invention. In another embodiment of the present invention, the system displays measured value of fuel density at measured temperature, the system also displays calculated value of fuel density at required temperature and also displays calculated value of variation in density. Here the invention is not limited by the exemplary representation of it. It can be appreciated that the given invention can be represented in many other possible ways along with other measured or calculated quantities related to the fuel density such as fuel temperature, time and date, fuel pump name and other details, fuel price etc. The person skilled in art may find other ways to represent the given invention using any possible combination of measured and collected information about fuel and density.

Figure 6B:
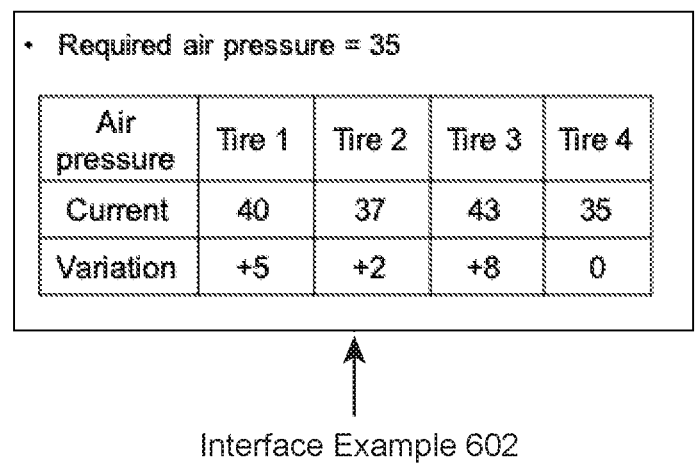

FIG. 6B represents an exemplary interface 602 of one of the embodiments of the present invention, here the air pressure inside the tire of the vehicle has been measured by the system and is displayed on Audio/video display module attached with the present invention. In this given example, the system displays measured value of tire pressure of all the tires attached or present with the vehicle at measured temperature of air present inside the tire. The system also displays required value of air pressure at given temperature which is calculated or stored in the memory or database of prediction and optimization module. Here the invention is not limited by the exemplary representation of it. It can be appreciated that the given invention can be represented in many other possible ways along with other measured or calculated quantities related to air pressure such as air temperature, time and date, nearest air monitoring station etc. The person skilled in art may find other ways to represent the given invention using any possible combination of measured and collected information about fuel and density.

Figure 6C:
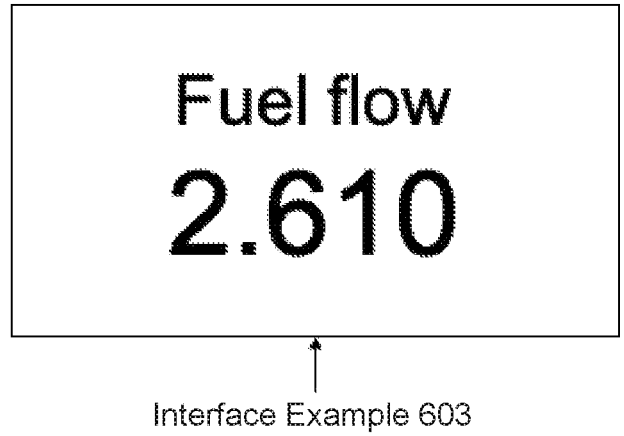

FIG. 6C represents an exemplary interface 603 of one of the embodiments of the present invention, here the volume of fuel flown through input and output vessel of the prediction and optimization module 300 has been measured by the system and is displayed on the Audio/video display module attached with the present invention. In the given example, the system displays measured value of fuel flown through the prediction and optimization module 300. The system may also displays other required measured or calculated values of fuel flown through the prediction and optimization module which is calculated or stored in the memory or database. Here the invention is not limited by the exemplary representation of it. It can be appreciated that the given invention can be represented in many other possible ways along with other measured or calculated quantities related to fuel such as fuel temperature, time and date, nearest fuel station, variation in quantity of fuel displayed at fuel pump and quantity of fuel measured with prediction and optimization module etc. The person skilled in art may find other ways to represent the given invention using any possible combination of measured and collected information about fuel and density.

Figure 6D:
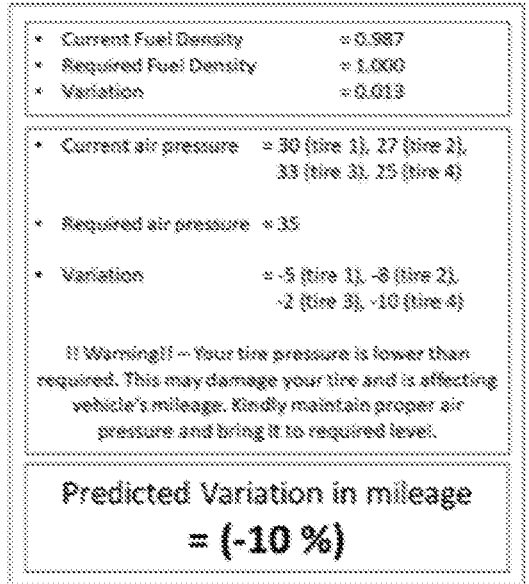
Figure 6E:
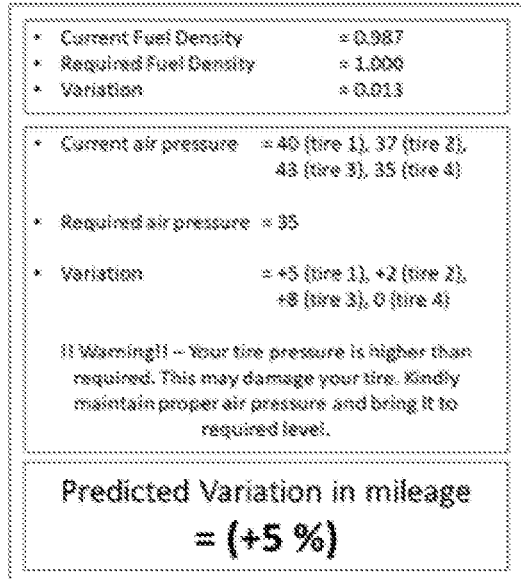
Figure 6F:
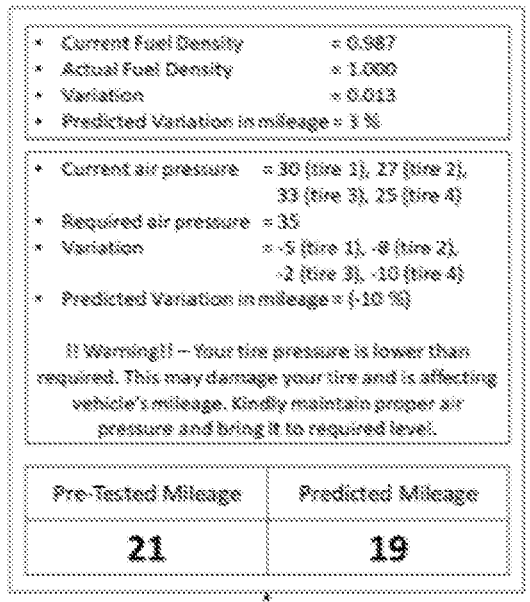
Figure 6G:
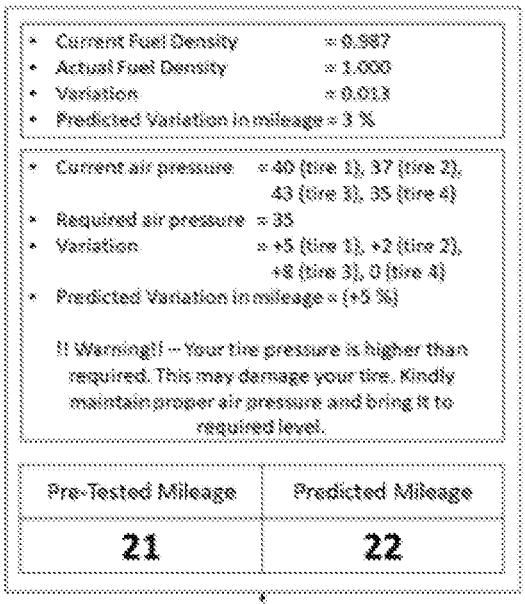

FIGS. 6D and 6E represents an exemplary interfaces 604 and 605 respectively of one of the embodiments of present invention. Here the system displays density of fuel along with required fuel density and variation in fuel density measure by the prediction and optimization module. The system also displays measured value of tire pressure of all the tires attached or present with the vehicle at measured temperature of air present inside the tire. The system also displays required value and variation of air pressure at given temperature which is calculated or stored in the memory or database of prediction and optimization module. Additionally, the system also displays an advisory or suggestion to the user about the variation in tire pressure and also displays the final calculated prediction about variation in mileage of vehicle. Similarly, in FIGS. 6F and 6G, the exemplary interfaces 606, 607 illustrates the values of mileage are predicted and displayed along with pre-determined mileage of the particular vehicle.

In an exemplary interfaces 608, 609 as illustrated in FIGS. 6H and 6I respectively, the system displays speed vs predetermined and predicted values of mileage vs gear combination. Here the system is capable of displaying current speed and mileage and gear and is also capable of predicting mileage variation on speeds which user is not driving. As an example, if a user is driving at speed of 80 km/h, the system displays pre-defined mileage 18, predicted mileage 15 kmpl and suggested gear 6th. Simultaneously, the system is also calculating and displaying variation in mileage of vehicle at other speeds which helps a user to drive at optimal and efficient speed. Here the invention is not limited by the exemplary representation of it. It can be appreciated that the given invention can be represented in many other possible ways along with other measured or calculated quantities related to fuel density, fuel volume, air pressure etc. It may be also appreciated that the interface described here is not limited by the design or method of displaying the information. The person skilled in art may find other ways to represent the given invention using any possible combination of measured and collected information.

In exemplary interfaces 610, 611 as illustrated in FIGS. 6J and 6K respectively, the system displays speed vs predicted values of mileage vs distance to empty vs Number of fuel stations. Here the system may use the information about available fuel quantity present inside the fuel tank, the information about the quantity of fuel dispensed into the fuel tank along with the predicted or predetermined mileage of the vehicle at particular speed(s) to determine distance to empty at different speeds. The system may use GPS processed data along with distance to empty to determine number of fuel station approachable by the vehicle with the available quantity of fuel in fuel tank. In one example, if a user is driving at speed of 80 km/h, as per available quantity of fuel and distance to empty, the user may reach 0 (zero) fuel stations before consuming all available fuel at current speed. But, in the same scenario, if user can shift to speed of 70, he may reach up to 1 fuel station before consuming all available fuel at current speed and can refill fuel from there. Simultaneously, the system is also calculating and displaying variation in mileage, distance to empty, No. of fuel stations etc. of vehicle at other speeds which helps a user to drive at optimal and efficient speed. Here the invention is not limited by the exemplary representation of it. It can be appreciated that the given invention can be represented in many other possible ways along with other measured or calculated quantities related to fuel density, fuel volume, air pressure etc. It may be also appreciated that the interface described here is not limited to display only speed, mileage, distance to empty and number of fuel stations. The system may also display other parameters like time to reach, penalty for driving faster than permissible speeds in an area, variable number of air monitoring stations, repair shops, garages etc. The invention is not limited by the design or method of displaying the information. The person skilled in art may find other ways to represent the given invention using any possible combination of measured and collected information.

Figures 6L, 6M:
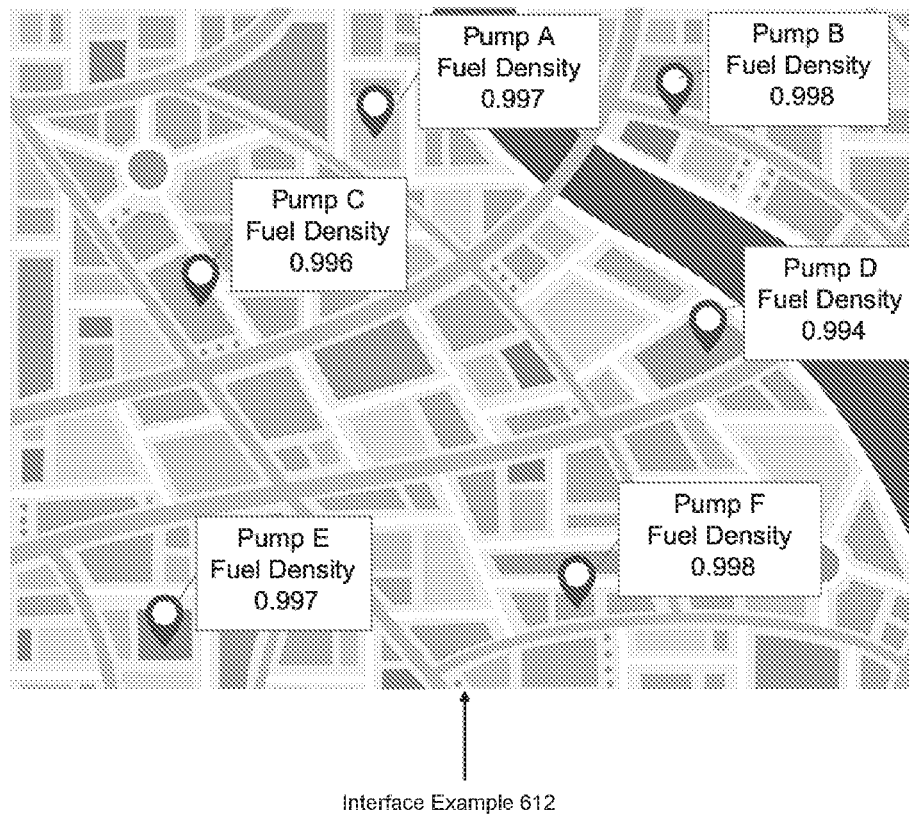

FIG. 6L represent an exemplary interface 612 of the present invention where the information about the available fuel stations in an area along with their measured fuel densities are provided to the user in the direction that the user is traveling. The display system allows the user to visually see an upcoming fuel stations along with the fuel densities of the fuel provided the respective fuel station. In addition, the system displays the roadways or freeways that the user would be driving on. The above described display systems allows the present display system to convey information to the user in a concise, clear and understandable manner. In one such example, the FIG. 6M illustrates exemplary interface 613 displaying the available fuel stations in an area along with their measured fuel densities in tabular format. Here the skilled person may also display other possible combinations of data like fuel price, fuel temperature etc. without limiting the scope of the present invention. In one embodiment, the exemplary interface described here can present the given information to the user in audio format, which can be played with application interface in background or may also display the same as pop-up display or combination thereof.

Figure 6N:
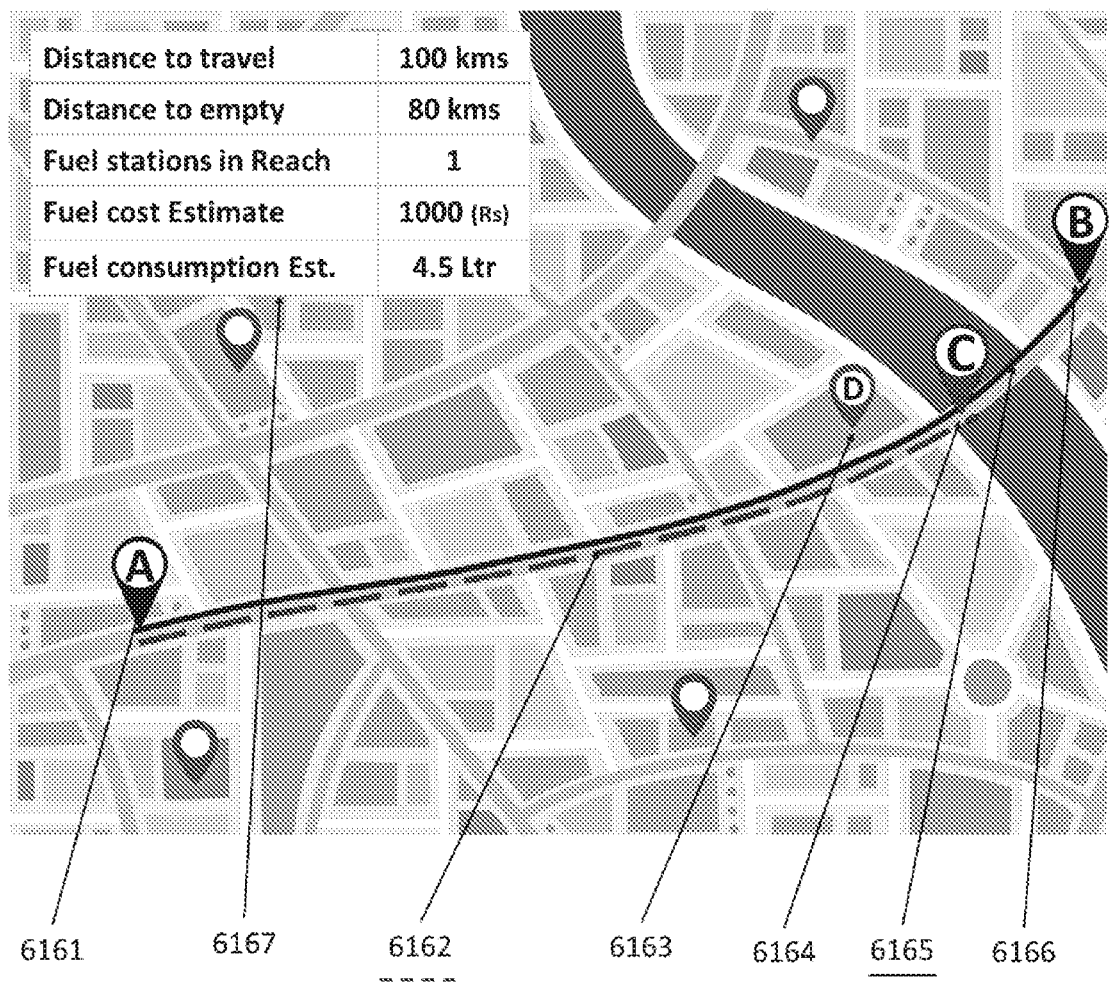

FIG. 6N represents an exemplary interface 614 of the present invention where the information about the "distance to empty", i.e. the distance which can be traveled by the vehicle with the amount of fuel available in the vehicle's fuel tank, is displayed on the navigational maps. Here the 6161 represents location A which may be the starting point of a journey, 6166 represents location B which may be the end point of the journey, 6164 represents location C which may be the point up to which vehicle can travel with available quantity of fuel in fuel tank of the vehicle, 6163 represents a fuel stations where vehicle's can be refueled, 6165 represents the route which user may follow to reach up to end location B and 6162 represents the route which user can travel with available amount of fuel in the fuel tank of the vehicle, 6167 represents an exemplary tabular format to display information to user. Here in the given example, the user plans to travel from point A to point B which is at a distance 100 kms from point A. But with the present amount of fuel the user may travel only 80 kms and may stop at point C. And here it has also been informed to the user that before consuming all available fuel, user may reach up to 1 fuel station from where user may refill the fuel tank to reach destination. The user is also informed about the estimated fuel cost and fuel consumption to reach to the destination (point B).

As described above, when the information related to fuel dispensed and tire are obtained and calculated, thereby showing the calculated and predicted information to the user, the user can put more confidence in provided information and the mileage of the vehicle can be optimized.

In the system and method described above, the mileage of the vehicle caused by each of the vehicle functions, devices or operations can be calculated quantitatively, thereby calculated information is provided comprehensively or selectively in response to user's request which can guide the user to drive more fuel efficiently.

Although the present invention has been described in terms of certain preferred embodiments, various features of separate embodiments can be combined to form additional embodiments not expressly described. Moreover, other embodiments apparent to those of ordinary skill in the art after reading this disclosure are also within the scope of this invention. Furthermore, not all of the features, aspects and advantages are necessarily required to practice the present invention. Thus, while the above detailed description has shown, described, and pointed out novel features of the invention as applied to various embodiments, it will be understood that various omissions, substitutions, and changes in the form and details of the apparatus or process illustrated may be made by those of ordinary skill in the technology without departing from the spirit of the invention. The inventions may be embodied in other specific forms not explicitly described herein. The embodiments described above are to be considered in all respects as illustrative only and not restrictive in any manner Thus, scope of the invention is indicated by the following claims rather than by the foregoing description.

We claim:

1. A mileage prediction and optimization system for a vehicle, the system comprising:
   a measuring and processing module (306) configured to measure current fuel volume, current fuel density, current fuel temperature, current tire air pressure, current tire air temperature of the vehicle;
   a speed measuring module (305) configured to measure current speed of the vehicle;
   an Electronic Control Unit (ECU) module (700) configured to fetch values from a plurality of sensors;
   a memory (303) configured to store at least one predefined mileage value;
   characterized by a prediction and optimization module (300) coupled to the measuring and processing module (306), the speed module (305), the ECU module (700), and the memory (303), wherein the prediction and optimization module being configured to:
   determine variation in mileage of the vehicle at least based on the current fuel volume, current speed, current fuel density, the current tire air pressure, the current tire air temperature, current fetched values from the ECU module (700) and the pre-defined mileage data of the vehicle, and
   optimize mileage of the vehicle by reducing variation of fuel density, reducing variation of tire air pressure and informing optimal gear-speed combinations regardless of whether the vehicle is stationary or in motion; and
   a display module (311) configured to display at least predicted variation in the mileage, variation in the fuel density, variation in the tire air pressure, predicted mileage corresponding to different gear-speed combinations.

2. The mileage prediction and optimization system for a vehicle according to claim 1, wherein the measuring and processing module (306) is coupled to a fuel volume measuring module (135), a fuel density measuring module (134), a fuel temperature measuring module (133), a tire air pressure measuring module (132) and a tire air temperature measuring module (131).

3. The mileage prediction and optimization system for a vehicle according to claim 1, wherein the system further comprises a distance estimation module (310) being configured to estimate information about distance to empty and time to reach destination at different gear-speed combinations.

4. The mileage prediction and optimization system for a vehicle according to claim 1, wherein the system further comprises a GPS data processing module (308) being configured to determine location and of places such as, but not limited to fuel stations, vehicle air monitoring stations, hospitals, garages, washrooms, restaurants, or a combination thereof corresponding to different routes those are reachable before the fuel goes empty.

5. The mileage prediction and optimization system for a vehicle according to claim 1, wherein the display module (311) comprising an audio/video unit to communicate with a user of the vehicle suggesting information such as, but not limited to, gears at current speeds, mileage at current speeds, mileage variation and gear change prediction at other speeds, current fuel density, current air pressure, ECU data, fuel station information with measured fuel density, best route to follow to achieve effective mileage, fuel prices by location match, or combination thereof.

6. The mileage prediction and optimization system for a vehicle according to claim 1, wherein the pre-defined mileage data is related to at least one of parameters such as, but not limited to, the different gear-speed combinations, fuel density, tire air pressure, values received from the ECU module, or a combination thereof.

7. The mileage prediction and optimization system for a vehicle according to claim 1, wherein the measuring and processing module 306 is further configured to inflate or deflate a vehicle tire to reduce the variation in tire air pressure of the vehicle.

8. The mileage prediction and optimization system for a vehicle according to claim 1, wherein the fetched values from the plurality of sensors by the ECU module (700) comprises, but not limited to, speed, gear value, fuel level, vehicle loading.

9. The mileage prediction and optimization system for a vehicle according to claim 1, the plurality of sensors are configured to sense values related to the vehicle, wherein the plurality of sensors comprises such as, but not limited to speed sensor, fuel level sensor, air pressure sensor, engine temperature sensor, or a combination thereof.

10. The mileage prediction and optimization system for a vehicle according to claim 1, wherein the system further comprises a data transmitting module (313) coupled to the prediction and optimization module (300) and an application server (200).

11. The mileage prediction and optimization system for a vehicle according to claim 10, wherein the data transmitting module (313) is wired (161) or wireless (163) communication system.

12. The mileage prediction and optimization system for a vehicle according to claim 10, wherein the data transmitting module (160) is based on Low Power Wide Area Network (LPWAN) technology (162) such as, but not limited to, LTE-M, LTE-MTC, narrowband IoT (NB-IoT).

13. The mileage prediction and optimization system for a vehicle according to claim 1, wherein the system further comprises a vehicle related information module (324) being configured to provide information such as, but not limited to distance traveled, vehicle identity, the location of the vehicle, direction of travel, or a combination thereof.

14. The mileage prediction and optimization system for a vehicle according to claim 1, wherein the system further comprises a plurality of sensing modules configured to measure a plurality of sensing values.

15. The mileage prediction and optimization system for a vehicle according to claim 1, wherein the measuring and processing module (306) comprises a light emitting device (156) configured to supply light brightness to illuminate a desired area of the vehicle.

16. The mileage prediction and optimization system for a vehicle according to claim 1, wherein the prediction and optimization module (300) comprises at least one of a microprocessor, a micro-controller, a memory module, a communication module, a user interface module, a display module, a monitoring means, or a combination thereof.

17. The mileage prediction and optimization system for a vehicle according to claim 1, wherein the prediction and optimization module (300) comprises at least one of a personal digital assistant (PDA), an automotive navigation system, a desktop computer, a television, a projector, a cinema screen, a laptop/notebook computer, a tablet computer, a mobile phone, a smartphone, a portable electronic device, or a media player device.

18. The mileage prediction and optimization system for a vehicle according to claim 1, wherein the measuring and processing module (306) comprises at least one of a personal digital assistant (PDA), an automotive navigation system, a desktop computer, a television, a projector, a cinema screen, a laptop/notebook computer, a tablet computer, a mobile phone, a smartphone, a portable electronic device, or a media player device.

19. The mileage prediction and optimization system for a vehicle according to claim 1, wherein the display (311) comprises at least one of an analog display or a digital display.

20. A method for predicting and optimizing vehicle mileage comprising:
Receiving a current fuel volume, a current fuel density, a current fuel temperature, a current tire air pressure, a current tire air temperature of the vehicle, via a measuring and processing module (306);
receiving a current speed of the vehicle, via a speed measuring module (305);
fetching current values of plurality of sensors, via an ECU module (700);
storing, via a memory at least a pre-defined mileage value (303);
characterized by determining variation in mileage of the vehicle, via a prediction and optimization module (300) based on the current fuel volume, current speed, current fuel density, current fuel temperature, current tire air pressure, current tire air temperature, current fetched values from the ECU module (700), and the pre-defined mileage data of the vehicle;
optimizing mileage of the vehicle, via a prediction and optimization module (300) by reducing variation in fuel density, reducing variation in air pressure and by informing optimal gear-speed combinations, regardless of whether the vehicle is stationary or in motion; and
displaying, via a display module (311), at least predicted variation in the mileage, variation in the fuel density, variation in the tire air pressure and predicted mileage corresponding to the gear-speed combinations.

21. The method of claim 20, wherein the measuring and processing module (306) is coupled to a fuel volume measuring module (135), a fuel density measuring module (134), a fuel temperature measuring module (133), a tire air pressure measuring module (132) and a tire air temperature measuring module (131).

22. The method of claim 20, wherein the method further comprises estimating, via a distance estimation module (310) information about distance to empty and time to reach destination at different gear-speed combinations.

23. The method of claim 20, wherein the method further comprises determining, via a GPS data processing module (308) location of places such as, but not limited to fuel stations, vehicle air monitoring stations, hospitals, garage, washrooms, restaurants, or a combination thereof corresponding to different routes those are reachable before the fuel goes empty.

24. The method of claim 20, wherein the method further comprises communicating to the user, via an audio/video unit (311) suggesting information such as, but not limited to, gears at current speeds, mileage at current speeds, mileage variation and gear change prediction at other speeds, current fuel density, current tire air pressure, ECU data, fuel station information with measured fuel density, best route to follow to achieve effective mileage, fuel prices by location match, or combination thereof.

25. The method of claim 20, wherein the pre-defined mileage data is related to at least one of parameters such as, but not limited to, the different gear-speed combinations, fuel density, tire air pressure, values received from the ECU module, or a combination thereof.

26. The method of claim 20, wherein the method further comprises inflating or deflating a vehicle tire to reduce the variation in tire air pressure of the vehicle.

27. The method of claim 20, wherein the fetched values, via the ECU module (700) comprises such as, but not limited to, speed, gear value, fuel level, vehicle loading from the plurality of sensors.

28. The method of claim 20, wherein the plurality of sensors are configured to sense values related to the vehicle such as, but not limited to speed sensor, fuel level sensor, air pressure sensor, engine temperature sensor, or a combination thereof.

29. The method of claim 20, communicating measured values related to the vehicle to the prediction and optimization module (300) and an application server (200), via a data transmitting module (313).

30. The method of claim 29, wherein the data transmitting module (313) is wired or wireless communication system.

31. The method of claim 29, wherein the data transmitting module (313) is based on Low Power Wide Area Network (LPWAN) technology (162) such as, but not limited to, LTE-M, LTE-MTC, narrowband IoT (NB-IoT).

32. The method of claim 20, wherein the method further comprises providing information related to vehicle such as, but not limited to distance traveled, vehicle identity, the location of the vehicle, direction of travel, or a combination thereof.

33. The method of claim 20, wherein the method further comprises measuring sensed values, via a plurality of sensing modules.

34. The method of claim 20, wherein the measuring and processing module (306) comprises a light emitting device (156) configured to supply light brightness to illuminate a desired area of the vehicle.

35. The method of claim 20, wherein the prediction and optimization module (300) comprises at least one of a microprocessor, a micro-controller, a memory module, a communication module, a user interface module, a display module, a monitoring means, or a combination thereof.

36. The method of claim 20, wherein the prediction and optimization module (300) comprises at least one of a personal digital assistant (PDA), an automotive navigation system, a desktop computer, a television, a projector, a cinema screen, a laptop/notebook computer, a tablet computer, a mobile phone, a smartphone, a portable electronic device, or a media player device.

37. The method of claim 20, wherein the measuring and processing module (306) comprises at least one of a personal digital assistant (PDA), an automotive navigation system, a desktop computer, a television, a projector, a cinema screen, a laptop/notebook computer, a tablet computer, a mobile phone, a smartphone, a portable electronic device, or a media player device.

38. The method of claim 20, wherein the display module (311) comprises at least one of an analog display or a digital display.

\* \* \* \* \*